(12) United States Patent
Sanghi et al.

(10) Patent No.: US 10,719,376 B2
(45) Date of Patent: Jul. 21, 2020

(54) METHODS AND APPARATUS FOR MULTIPLEXING DATA FLOWS VIA A SINGLE DATA STRUCTURE

(71) Applicant: Apple Inc., Cupertino, CA (US)

(72) Inventors: Karan Sanghi, San Jose, CA (US); Saurabh Garg, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/112,383

(22) Filed: Aug. 24, 2018

(65) Prior Publication Data

US 2020/0065161 A1    Feb. 27, 2020

(51) Int. Cl.
| | |
|---|---|
| G06F 3/00 | (2006.01) |
| G06F 9/44 | (2018.01) |
| G06F 9/46 | (2006.01) |
| G06F 13/00 | (2006.01) |
| G06F 9/54 | (2006.01) |
| G06F 15/173 | (2006.01) |
| G06F 9/38 | (2018.01) |

(52) U.S. Cl.
CPC ............ *G06F 9/542* (2013.01); *G06F 9/3867* (2013.01); *G06F 15/17375* (2013.01)

(58) Field of Classification Search
CPC ....................................................... G06F 9/54
USPC ........................................................ 719/318
See application file for complete search history.

(56) References Cited

U.S. PATENT DOCUMENTS

| | | |
|---|---|---|
| 4,805,137 A | 2/1989 | Grant et al. |
| 4,949,299 A | 8/1990 | Pickett et al. |
| 4,987,529 A | 1/1991 | Craft et al. |
| 5,367,688 A | 11/1994 | Croll |
| 5,467,459 A | 11/1995 | Alexander et al. |

(Continued)

FOREIGN PATENT DOCUMENTS

| | | |
|---|---|---|
| EP | 3013008 A1 | 4/2016 |
| JP | H02306082 A | 12/1990 |

(Continued)

OTHER PUBLICATIONS

ECN L1 PM Substates with CLKREQ approved Aug. 23, 2012.

(Continued)

*Primary Examiner* — Timothy A Mudrick
(74) *Attorney, Agent, or Firm* — Gazdzinski & Associates, PC

(57) ABSTRACT

Methods and apparatus for transacting multiple data flows between multiple processors. In one such implementation, multiple data pipes are aggregated over a common transfer data structure. Completion status information corresponding to each data pipe is provided over individual completion data structures. Allocating a common fixed pool of resources for data transfer can be used in a variety of different load balancing and/or prioritization schemes; however, individualized completion status allows for individualized data pipe reclamation. Unlike prior art solutions which dynamically created and pre-allocated memory space for each data pipe individually, the disclosed embodiments can only request resources from a fixed pool. In other words, outstanding requests are queued (rather than immediately serviced with a new memory allocation), thus overall bandwidth remains constrained regardless of the number of data pipes that are opened and/or closed.

20 Claims, 13 Drawing Sheets

(56) References Cited

U.S. PATENT DOCUMENTS

| | | |
|---|---|---|
| 5,485,578 A | 1/1996 | Sweazey |
| 5,613,086 A | 3/1997 | Frey et al. |
| 5,659,542 A | 8/1997 | Bell et al. |
| 5,708,779 A | 1/1998 | Graziano et al. |
| 5,731,973 A | 3/1998 | Takaishi et al. |
| 5,850,395 A | 12/1998 | Hauser et al. |
| 5,903,564 A | 5/1999 | Ganmukhi et al. |
| 5,943,507 A | 8/1999 | Cornish et al. |
| 6,008,992 A | 12/1999 | Kawakami |
| 6,216,178 B1 | 4/2001 | Stracovsky et al. |
| 6,233,702 B1 | 5/2001 | Horst et al. |
| 6,260,152 B1 | 7/2001 | Cole et al. |
| 6,359,863 B1 | 3/2002 | Varma et al. |
| 6,411,997 B1 | 6/2002 | Dawes et al. |
| 6,434,633 B1 | 8/2002 | Braun et al. |
| 6,485,081 B1 | 11/2002 | Bingle et al. |
| 6,523,073 B1 | 2/2003 | Kammer et al. |
| 6,553,446 B1 | 4/2003 | Miller |
| 6,693,895 B1 | 2/2004 | Crummey et al. |
| 6,735,642 B2 | 5/2004 | Kagan et al. |
| 6,815,873 B2 | 11/2004 | Johnson et al. |
| 6,840,257 B2 | 1/2005 | Dario et al. |
| 6,843,465 B1 | 1/2005 | Scott |
| 6,947,442 B1 | 9/2005 | Sato et al. |
| 6,948,094 B2 | 9/2005 | Schultz et al. |
| 6,973,701 B2 | 12/2005 | Momoda et al. |
| 7,013,536 B2 | 3/2006 | Golden et al. |
| 7,032,282 B2 | 4/2006 | Powell et al. |
| 7,055,793 B2 | 6/2006 | Biehl et al. |
| 7,100,020 B1 | 8/2006 | Brightman et al. |
| 7,127,600 B2 | 10/2006 | Zimmer et al. |
| 7,191,240 B1 | 3/2007 | Johnson |
| 7,281,172 B2 | 10/2007 | Chujo |
| 7,347,221 B2 | 3/2008 | Berger et al. |
| 7,397,774 B1 | 7/2008 | Holland et al. |
| 7,398,382 B2 | 7/2008 | Rothman et al. |
| 7,506,084 B2 | 3/2009 | Moerti et al. |
| 7,509,391 B1 | 3/2009 | Chauvel et al. |
| 7,587,575 B2 | 9/2009 | Moertl et al. |
| 7,590,817 B2 | 9/2009 | Moertl et al. |
| 7,617,377 B2 | 11/2009 | Moertl et al. |
| 7,650,914 B2 | 1/2010 | Bogursky et al. |
| 7,681,012 B2 | 3/2010 | Verm et al. |
| 7,685,476 B2 | 3/2010 | Andre et al. |
| 7,853,731 B1 | 12/2010 | Zeng |
| 7,899,941 B2 | 3/2011 | Hendry et al. |
| 7,908,335 B1 | 3/2011 | Citterelle et al. |
| 7,926,520 B2 | 4/2011 | Bogursky et al. |
| 7,941,682 B2 | 5/2011 | Adams |
| 8,113,243 B2 | 2/2012 | Bogursky et al. |
| 8,230,248 B2 | 7/2012 | Dance |
| 8,255,725 B2 | 8/2012 | Shimazaki et al. |
| 8,352,624 B2 | 1/2013 | Zimmerman et al. |
| 8,422,404 B2 | 4/2013 | Taki |
| 8,468,285 B2 | 6/2013 | Kobayashi |
| 8,540,206 B2 | 9/2013 | Foshansky et al. |
| 8,555,099 B2 | 10/2013 | Marinkovic et al. |
| 8,635,412 B1 | 1/2014 | Wilshire |
| 8,656,228 B2 | 2/2014 | Check et al. |
| 8,769,168 B2 | 7/2014 | Moertl et al. |
| 8,788,822 B1 | 7/2014 | Riddle |
| 8,799,537 B1 | 8/2014 | Zhu et al. |
| 8,808,091 B2 | 8/2014 | Shaw et al. |
| 8,819,386 B1 | 8/2014 | Mather |
| 8,832,331 B2 | 9/2014 | Co |
| 8,848,809 B2 | 9/2014 | Whitby-Strevens |
| 8,851,443 B2 | 10/2014 | Foshansky |
| 8,876,062 B1 | 11/2014 | Baghdasarian |
| 8,914,649 B2 | 12/2014 | So et al. |
| 8,939,180 B2 | 1/2015 | Bogursky et al. |
| 8,946,934 B2 | 2/2015 | Butts et al. |
| 9,027,903 B2 | 5/2015 | Arekar et al. |
| 9,152,580 B1 | 10/2015 | Chau et al. |
| 9,170,957 B2 | 10/2015 | Touzni et al. |
| 9,280,360 B2 | 3/2016 | Xu et al. |
| 9,319,090 B2 | 4/2016 | Whitby-Strevens |
| 9,544,069 B2 | 1/2017 | Whitby-Strevens et al. |
| 9,547,535 B1 | 1/2017 | Wilt |
| 9,568,970 B1 | 2/2017 | Kaushal et al. |
| 9,582,448 B2 | 2/2017 | Saitou |
| 9,594,718 B2 | 3/2017 | Kaushik et al. |
| 9,769,756 B1 | 9/2017 | Cui et al. |
| 9,830,289 B2 | 11/2017 | Pulyala et al. |
| 9,910,475 B2 | 3/2018 | Kurts et al. |
| 9,913,305 B2 | 3/2018 | Pinheiro et al. |
| 9,932,757 B2 | 4/2018 | Hager et al. |
| 9,959,124 B1 | 5/2018 | Herbeck et al. |
| 2002/0013868 A1 | 1/2002 | West |
| 2002/0044553 A1 | 4/2002 | Chakravorty |
| 2002/0065867 A1 | 5/2002 | Chauvel |
| 2002/0169938 A1 | 11/2002 | Scott et al. |
| 2002/0195177 A1 | 12/2002 | Hinkley et al. |
| 2003/0014607 A1 | 1/2003 | Slavin et al. |
| 2003/0086122 A1 | 5/2003 | Parry |
| 2003/0200413 A1 | 10/2003 | Gurumoorthy et al. |
| 2004/0044929 A1 | 3/2004 | Chujo |
| 2004/0064589 A1 | 4/2004 | Boucher et al. |
| 2004/0128568 A1 | 7/2004 | O'Shea |
| 2004/0179546 A1 | 9/2004 | McDaniel et al. |
| 2004/0201749 A1 | 10/2004 | Malloy |
| 2004/0221056 A1 | 11/2004 | Kobayashi |
| 2004/0228365 A1 | 11/2004 | Kobayashi |
| 2005/0005980 A1 | 1/2005 | Eberhardt et al. |
| 2005/0076196 A1 | 4/2005 | Zimmer et al. |
| 2005/0108385 A1 | 5/2005 | Wechter et al. |
| 2005/0114620 A1 | 5/2005 | Justen |
| 2005/0117601 A1 | 6/2005 | Anderson et al. |
| 2005/0149711 A1 | 7/2005 | Zimmer et al. |
| 2005/0157781 A1 | 7/2005 | Ho et al. |
| 2005/0198777 A1 | 9/2005 | Mabe |
| 2005/0285862 A1 | 12/2005 | Noda et al. |
| 2006/0039285 A1 | 2/2006 | Chapman et al. |
| 2006/0107071 A1 | 5/2006 | Girish et al. |
| 2006/0186700 A1 | 8/2006 | Browne et al. |
| 2006/0186706 A1 | 8/2006 | Browne et al. |
| 2006/0218301 A1 | 9/2006 | O'Toole et al. |
| 2006/0232051 A1 | 10/2006 | Morris et al. |
| 2007/0005869 A1 | 1/2007 | Balraj et al. |
| 2007/0043901 A1 | 2/2007 | Wu et al. |
| 2007/0063540 A1 | 3/2007 | Browne et al. |
| 2007/0063541 A1 | 3/2007 | Browne et al. |
| 2007/0070997 A1 | 3/2007 | Weitz et al. |
| 2007/0080013 A1 | 4/2007 | Melz et al. |
| 2007/0118831 A1 | 5/2007 | Kondo |
| 2007/0180041 A1 | 8/2007 | Suzuoki |
| 2007/0201492 A1 | 8/2007 | Kobayashi |
| 2007/0226417 A1 | 9/2007 | Davis |
| 2007/0261307 A1 | 11/2007 | Alexander et al. |
| 2007/0286246 A1 | 12/2007 | Kobayashi et al. |
| 2008/0007081 A1 | 1/2008 | Shibata et al. |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0100079 A1 | 5/2008 | Herrera et al. |
| 2008/0100092 A1 | 5/2008 | Gao et al. |
| 2008/0120911 A1 | 5/2008 | Browne et al. |
| 2008/0183931 A1 | 7/2008 | Verm et al. |
| 2008/0231711 A1 | 9/2008 | Glen et al. |
| 2008/0235355 A1 | 9/2008 | Spanier et al. |
| 2008/0244259 A1 | 10/2008 | Zimmer et al. |
| 2008/0301148 A1 | 12/2008 | Lee et al. |
| 2009/0024924 A1 | 1/2009 | Kim |
| 2009/0113141 A1 | 4/2009 | Bullman et al. |
| 2009/0138650 A1 | 5/2009 | Lin et al. |
| 2009/0177847 A1 | 7/2009 | Ceze et al. |
| 2009/0189442 A1 | 7/2009 | Chi |
| 2009/0282050 A1 | 11/2009 | Thomas et al. |
| 2009/0282088 A1 | 11/2009 | Thomas et al. |
| 2009/0322531 A1 | 12/2009 | Estevez et al. |
| 2010/0017655 A1 | 1/2010 | Gooding et al. |
| 2010/0030932 A1 | 2/2010 | Ergas et al. |
| 2010/0082859 A1 | 4/2010 | Hendry et al. |
| 2010/0098419 A1 | 4/2010 | Levy et al. |
| 2010/0329319 A1 | 12/2010 | Dai et al. |

(56) References Cited

U.S. PATENT DOCUMENTS

| | | |
|---|---|---|
| 2011/0022859 A1 | 1/2011 | More et al. |
| 2011/0029696 A1 | 2/2011 | Uehara |
| 2011/0035575 A1 | 2/2011 | Kwon |
| 2011/0052142 A1 | 3/2011 | Sultenfuss et al. |
| 2011/0083002 A1 | 4/2011 | Albers et al. |
| 2011/0219208 A1 | 9/2011 | Asaad et al. |
| 2011/0242425 A1 | 10/2011 | Zeng |
| 2011/0248865 A1 | 10/2011 | Hong et al. |
| 2011/0257983 A1 | 10/2011 | Rathonyi et al. |
| 2011/0276710 A1 | 11/2011 | Mighani et al. |
| 2011/0283031 A1 | 11/2011 | Lee |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0072658 A1 | 3/2012 | Hashimoto et al. |
| 2012/0084483 A1 | 4/2012 | Sanjive |
| 2012/0084484 A1 | 4/2012 | Post et al. |
| 2012/0102307 A1 | 4/2012 | Wong |
| 2012/0124252 A1 | 5/2012 | Kayama et al. |
| 2012/0151913 A1 | 6/2012 | Foshansky |
| 2012/0159513 A1 | 6/2012 | Pakhunov et al. |
| 2012/0224640 A1 | 9/2012 | Sole et al. |
| 2012/0229076 A1 | 9/2012 | Zhu et al. |
| 2012/0306553 A1 | 12/2012 | Kim et al. |
| 2013/0050216 A1 | 2/2013 | Whitby-Strevens et al. |
| 2013/0057567 A1 | 3/2013 | Frank et al. |
| 2013/0091772 A1 | 4/2013 | Berger et al. |
| 2013/0111896 A1 | 5/2013 | Foshansky et al. |
| 2013/0124895 A1 | 5/2013 | Saha et al. |
| 2013/0138840 A1 | 5/2013 | Kegel et al. |
| 2013/0162911 A1 | 6/2013 | Glen |
| 2013/0290947 A1 | 10/2013 | Li |
| 2014/0033220 A1 | 1/2014 | Campbell et al. |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0215236 A1 | 7/2014 | Heinrich et al. |
| 2014/0244866 A1 | 8/2014 | Manula et al. |
| 2014/0247983 A1 | 9/2014 | Macinnis et al. |
| 2015/0036051 A1 | 2/2015 | Broberg et al. |
| 2015/0189109 A1 | 7/2015 | Whitby-Strevens et al. |
| 2015/0205749 A1 | 7/2015 | Whitby-Strevens et al. |
| 2015/0212806 A1 | 7/2015 | Hsieh |
| 2015/0267690 A1 | 9/2015 | Foshansky et al. |
| 2015/0293873 A1 | 10/2015 | Shao et al. |
| 2015/0309650 A1 | 10/2015 | Ahmed et al. |
| 2015/0309940 A1 | 10/2015 | Kumar et al. |
| 2015/0378737 A1 | 12/2015 | Debbage et al. |
| 2016/0034195 A1 | 2/2016 | Li et al. |
| 2016/0041852 A1 | 2/2016 | Suarez et al. |
| 2016/0077989 A1* | 3/2016 | Pulyala ............... G06F 13/287 710/308 |
| 2016/0091959 A1 | 3/2016 | Barak et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0179157 A1 | 6/2016 | Ardanaz et al. |
| 2016/0208539 A1 | 7/2016 | Hofmann et al. |
| 2016/0224442 A1 | 8/2016 | Sanghi et al. |
| 2016/0269991 A1 | 9/2016 | Van et al. |
| 2016/0299860 A1 | 10/2016 | Harriman |
| 2016/0364350 A1 | 12/2016 | Sanghi et al. |
| 2017/0089641 A1 | 3/2017 | Humfeld et al. |
| 2017/0108912 A1 | 4/2017 | Li et al. |
| 2017/0177222 A1 | 6/2017 | Singh et al. |
| 2017/0228481 A1 | 8/2017 | Pusuluri et al. |
| 2017/0249098 A1 | 8/2017 | Petkov et al. |
| 2017/0269675 A1 | 9/2017 | Klacar et al. |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2018/0074572 A1 | 3/2018 | Bauman et al. |
| 2018/0101498 A1 | 4/2018 | Cosby et al. |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0160155 A1 | 6/2018 | Iguchi et al. |
| 2018/0162770 A1 | 6/2018 | Hawtof et al. |
| 2018/0225251 A1 | 8/2018 | Sthoeger et al. |
| 2018/0367460 A1 | 12/2018 | Gao et al. |
| 2019/0073011 A1 | 3/2019 | Paterson et al. |

FOREIGN PATENT DOCUMENTS

| | | |
|---|---|---|
| JP | H03169996 A | 7/1991 |
| JP | 2004086792 A | 3/2004 |
| JP | 2012108677 A | 6/2012 |
| JP | 2013246642 A | 12/2013 |
| JP | 2015001867 A | 1/2015 |
| KR | 20150041072 A | 4/2015 |
| KR | 20150079788 A | 7/2015 |
| WO | WO-2008070138 A2 | 6/2008 |

OTHER PUBLICATIONS

Jackson, "PCI Express Technology", Sep. 2012 (Sep. 2012), MindShare Press, XP002777351, pp. 49,86,87,712-723.

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

* cited by examiner

METHODS AND APPARATUS FOR MULTIPLEXING DATA FLOWS VIA A SINGLE DATA STRUCTURE

RELATED APPLICATIONS

This application is related to commonly owned U.S. patent application Ser. No. 15/865,638 entitled "METHODS AND APPARATUS FOR REDUCED-LATENCY DATA TRANSMISSION OVER AN INTER-PROCESSOR COMMUNICATION LINK BETWEEN INDEPENDENTLY OPERABLE PROCESSORS" and filed Jan. 9, 2018; Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" and filed Oct. 8, 2015; Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS" and filed Oct. 8, 2015; Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS" and filed Oct. 8, 2015; and Ser. No. 14/856,283 entitled "METHODS AND APPARATUS FOR AGGREGATING PACKET TRANSFER OVER A VIRTUAL BUS INTERFACE" and filed Sep. 16, 2015; each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technical Field

The disclosure relates generally to the field of electronics devices, as well as networks thereof. More particularly, and in one exemplary aspect, the disclosure is directed to methods and apparatus for transacting multiple data flows between multiple processors. In various exemplary aspects, the present disclosure is directed to multiplexing data flows via a single transfer ring.

2. Description of Related Technology

Consumer devices and computer systems have grown more sophisticated over time, and have led to architectures that incorporate multiple processing components (e.g., processors). Each of these multiple processors play a distinct role in accomplishing one or more functions of e.g., a consumer device (e.g., smartphone, tablet, laptop, phablet, smartwatch, portable media player, smart home device, intelligent personal assistant, etc.).

Various bus architectures and techniques have evolved over time which are able to handle increasingly faster data rates and provide higher levels of data throughput appropriate for recent implementations. One such bus architecture is based on a so-called "ring buffer". A ring or circular buffer is a data structure that stores data records into a fixed-size buffer in a single direction (e.g., top to bottom); when the buffer is full, the buffer "wraps" and any newly added data records overwrite the earliest data records, thereby mimicking a ring. Ring buffers can transfer data with very low overhead. Since the ring buffer only writes data in a single direction, adding data can be done very quickly with minimal memory manipulation (e.g., no address shuffling, or rewriting data record overhead). Moreover, so long as the data is consumed at approximately the same rate as it is stored, the ring buffer will not "overflow" (i.e., overwrite data entries which have not yet been consumed), or "underflow" (i.e., read data entries which contain stale data).

Incipient research is directed to bus technologies for use in multi-processor architectures for mobile devices. For example, one implementation of an inter-processor communication (IPC) link is derived from Peripheral Component Interconnect Express (PCIe) technology. PCIe was originally designed for desktop and/or server applications. However, unlike desktop/server computing applications, mobile devices are significantly constrained in terms of power consumption, processing power, memory capacity, and any number of other mobility related constraints.

Various implementations of IPC dynamically create and/or destroy multiple "data pipes" for transferring "data flows" between applications. When a data pipe is created, memory management logic pre-allocates memory space for a corresponding ring buffer. This pre-allocated memory space is reserved for the data pipe alone. In this manner, each application can independently transact data flows without directly affecting (or being affected by) other concurrent application transfers. Unfortunately, since the memory space is reserved only for the application, the memory space is "in use" even when the data pipe is not actively transacting data flows.

Memory consumption is a consideration for desktop and/or server applications; however the memory limitations imposed on mobile devices are much higher. As a result, efficient memory management is a priority for mobile applications. For example, pre-allocated memory that is not used significantly reduces the resources that are available for pending active transfers. In other words, multiple data pipes that are allocated but not in active use can "bloat" memory consumption and reduce overall device performance.

To these ends, solutions are needed for handling multiple applications within mobile applications. Ideally, such solutions would efficiently manage memory, minimize computational complexity, and/or reduce power consumption. More generally, improved methods and apparatus are needed for transacting multiple data flows between multiple processors.

SUMMARY

The present disclosure satisfies the foregoing needs by providing, inter alia, methods and apparatus for transacting multiple data flows between multiple processors.

In one aspect, a method for de-multiplexing data flows via a common data structure is disclosed. In one embodiment, the method includes: providing a common data structure to another processor; responsive to a transfer event, reading an individual completion pipe to identify a completed portion of the common data structure; de-multiplexing a data flow for a data pipe from the common data structure based on the completed portion; and freeing the completed portion of the common data structure.

In one variant, the providing of the common data structure includes allocating a first memory space for the common data structure that is a fixed size. In one such variant, allocating the first memory space includes determining the fixed size based on one or more physical bus considerations.

In another variant, the de-multiplexing of the data flow for the data pipe includes reading one or more tags associated with the completed portion, wherein the one or more tags identify the data pipe from the plurality of data pipes. In one such variant, de-multiplexing the data flow for the data pipe further includes sequentially ordering one or more data payloads within the completed portion. In another such variant, the plurality of data pipes multiplexed within the common data structure are fairly multiplexed. In still another such variant, the plurality of data pipes multiplexed within the common data structure are unfairly multiplexed according to one or more priority schemes.

In yet another variant, the providing of the common data structure includes describing a transfer ring with at least one index array; and freeing the completed portion of the common data structure includes updating the at least one index array.

In yet another variant, the providing of the common data structure includes describing a transfer ring with at least one index array and the transfer event includes a change to the at least one index array.

In another aspect, a method for multiplexing a plurality of data flows corresponding to a plurality of data pipes into a common data structure is disclosed. In one embodiment, the method includes: receiving the common data structure; multiplexing the plurality of data flows corresponding to the plurality of data pipes into the common data structure; writing a plurality of tags to a plurality of individual completion pipes, wherein each individual completion pipe corresponds to a data pipe; and wherein each tag of the plurality of tags identifies a corresponding portion of the common data structure.

In one variant, the multiplexing the plurality of data flows includes, for each data flow: dividing the each data flow into a set of records; wherein the set of records is associated with a corresponding data pipe of the each data flow. In one such variant, the multiplexing of the plurality of data flows further includes: selecting records associated with one or more data flows for multiplexing; and for each selected record: writing the selected record to a portion of the common data structure. In another such variant, selecting records fairly allocates bandwidth to the plurality of data flows. In yet another such variant, selecting records unfairly allocates bandwidth to prioritize one or more data flows.

In yet another aspect, an apparatus configured to transact multiple data flows between multiple processors is disclosed. In one embodiment, the apparatus includes: a first processor in data communication with a second processor; and logic configured to allocate a common transfer ring within a non-transitory computer-readable medium.

In another such embodiment, the apparatus includes a non-transitory computer-readable medium comprising instructions which when executed by the first processor causes the first processor to: receive one or more completion descriptors within an individual completion ring; identify one or more transfer descriptors of the common transfer ring based on the received one or more completion descriptors; retrieve data payloads associated with the identified one or more transfer descriptors; reconstruct one or more data flows based on the retrieved data payloads; and free the identified one or more transfer descriptors within the common transfer ring.

In another such variant, the common transfer ring is characterized by a tail index; and the logic configured to free the identified one or more transfer descriptors writes to the tail index.

In yet another variant, the individual completion ring is characterized by a head index; and the logic configured to receive one or more completion descriptors reads the head index.

In yet another variant, the common transfer ring multiplexes data payloads for the one or more data flows associated with a plurality of data pipes; and the individual completion ring is associated with only one data pipe. In yet another such variant, the apparatus includes logic configured to reconstruct the only one data pipe from the retrieved data payloads based on the received one or more completion descriptors.

In yet another variant, the logic is configured to retrieve the data payloads in an order to prioritize at least one data flow independently of the second processor.

In yet another aspect, a processor configured to multiplex data flows via a common data structure is disclosed. In one exemplary embodiment, the processor is coupled to non-transitory computer-readable medium that include one or more instructions which when executed by the processor, cause the processor to multiplex one or more data flows via a common data structure.

In yet another aspect, a processor configured to de-multiplex data flows via a common data structure is disclosed. In one exemplary embodiment, the processor is coupled to non-transitory computer-readable medium that include one or more instructions which when executed by the processor, cause the processor to de-multiplex data flows from a common data structure.

In yet another aspect, a system for enabling multiple processors to share a common data structure for any number of data transfers is disclosed. In one exemplary embodiment, the system includes a consumer electronics apparatus. In one such variant the consumer electronics apparatus is selected from the group including: smartphone, tablet, laptop, phablet, smartwatch, portable media player, smart home device, intelligent personal assistant.

Various other methods and/or apparatus configured to, inter alia, optimize memory management of a commonly shared data structure based on memory usage and/or application requirements are also disclosed herein. In some variants, the methods and/or apparatus are further configured to optimize for different data transfers.

In other variants, the methods and/or apparatus are configured to manage multiple ongoing data transfers via individual completion data structures. In yet other variants, the methods and/or apparatus are configured to use completion descriptors to moderate the flow of data transfer.

Other features and advantages of the present disclosure will immediately be recognized by persons of ordinary skill in the art with reference to the attached drawings and detailed description of exemplary embodiments as given below.

Figure 1:
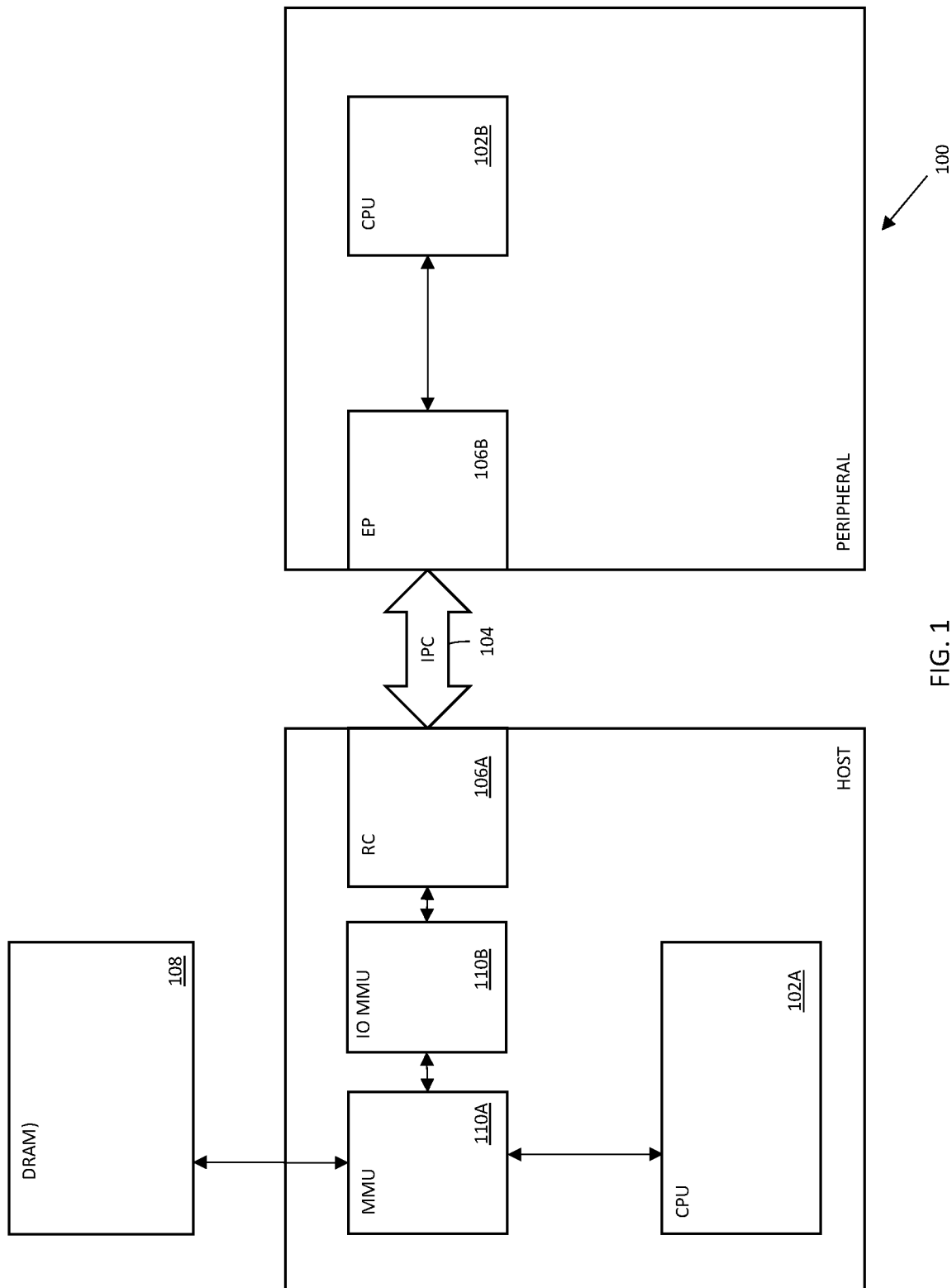
FIG. 1 is a logical block diagram of one exemplary apparatus, useful for explaining various principles described herein.

All figures © Copyright 2018 Apple Inc. All rights reserved

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of an inter-processor communication (IPC) link such as, for example, the type described within commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" and filed Oct. 8, 2015, previously incorporated herein by reference in its entirety, it will be recognized by those of ordinary skill that the present disclosure is not so limited. In fact, the various aspects of the disclosure are useful in any device or network of devices that is configured to transact a variety of different data types via a shared memory interface.

Exemplary Apparatus

As previously noted, bus techniques have evolved which are able to handle faster data rates and provide higher levels of data throughput. One such example bus technology is referred to as a so-called Peripheral Component Interconnect Express (PCIe) bus. PCIe has historically been used as a high-speed serial computer expansion bus technology. PCIe is based on point-to-point connectivity with separate serial links connecting every endpoint component (e.g., graphics card, memory, etc.) to the root complex (e.g., host processor). However, existing PCIe technologies consume significant power and are unsuitable for relatively low-power and low-latency communication protocols used in consumer electronics applications. Current PCIe bus protocols perform operations involving data transactions that are more appropriate for bulk, high-throughput data communication between a "peripheral" processor and the "host" processor.

Within this context, exemplary methods and apparatus are now described which support an inter-processor communication (IPC) link between two (or more) independently operable processors. The following discussions will be described in reference to a "root complex" (RC) or host processor, and an "endpoint" (EP) or peripheral processor. For reasons which will become apparent below, it is appreciated that the designation as to host or peripheral processor is used to simplify and/or clarify the following explanations, and does not imply existing host or peripheral functionality, or that such roles cannot be reversed. Moreover, those of ordinary skill in the related arts will readily appreciate that the various principles described herein, may broadly apply to any network of two (or more) independently operable processors. Further, the various principles described herein may apply to transactions from a host processor to a peripheral processor and vice versa.

As used herein, the term "independently operable processor" refers to a processing system having one or more of the processor clock domain, processor power domain, processor code base, arithmetic units, registers, and/or memory, capable of being isolated so as to allow the processor to operate without necessarily requiring other processors to be in the processing system. For example, an independently operable processor may transition into various power-conserving modes independent of the power-conserving modes, if any, of other processor(s). In some implementations, an independently operable processor can adjust its clock frequency, phase, and/or amplitudes, independent of the power-conserving modes of other processor(s). In still other implementations, an independently operable processor can reboot and/or update its firmware or software independent of the software execution of other processor(s).

As used herein, a "processor" refers generally to any logic or circuitry that responds to and processes computer-readable instructions or firmware that are stored within, for example, a non-transitory computer-readable medium (e.g., a memory). A processor may be embodied in hardware (e.g., an integrated circuit (IC)) that performs logical operations according to the instructions. Examples of processing alternatives include, without limitation, reduced instruction set computer (RISC) processors, complex instruction set computing (CISC) processors, field-programmable gate arrays (FPGAs), application specific integrated circuits (ASICs), and programmable logic devices (PLDs).

As used herein, an "application processor" is a processor that is configured to execute an operating system (OS) and one or more applications, firmware, and/or software. The term "operating system" refers to software that controls and manages access to hardware. An OS commonly supports processing functions such as e.g., task scheduling, application execution, input and output management, memory management, security, and peripheral access. As used herein, the term "application" refers to software that can interact with the hardware via procedures and interfaces offered by the OS.

As used herein, a "baseband processor" is a processor that is configured to communicate with a wireless network. Common examples of wireless networks include, without limitation, Long Term Evolution/Advanced (LTE and LTE-A) technology, IEEE-Std. 802.11 (any variants thereof), PAN technology such as e.g., Bluetooth (IEEE Std. 802.15.1) or IEEE Std. 802.15.4, "ZigBee", Short Messaging Service (SMS), near field communication (NFC) or radio-frequency identification (RFID), WiMAX (IEEE 802.16), WMANs, 3G cellular (e.g., WCDMA, 3GPP, 3GPP2, and GSM and improvements thereon, and ISM band networks).

In one aspect, an IPC protocol may be based on a "shared" memory interface for run-time processing. That is, the independently operable processors may each share, either virtually or physically, a common memory interface. In one such implementation, the shared memory interface provides a multi-channel IPC link for high throughput transfers. In some implementations, the shared memory interface may remain functional when any one of the independently operable processors is active, even when one or more of the remaining independently operable processors are asleep, powered down, powered off, etc.

As used herein, the term "logical" is used to refer to, without limitation, an abstraction (typically performed in software or machine logic) to represent physical mechanisms, attributes or functionalities as a data structure. For example, as used herein a "logical bus interface," refers generally to an abstraction or representation of a bus interface as a series of data structures. In contrast, a "physical bus interface" as used herein refers to the physical mechanisms, attributes or functionalities of a physically tangible bus interface.

FIG. 1 illustrates exemplary apparatus 100 useful for illustrating various ones of the principles described herein. As shown, the apparatus 100 includes first and second independently operable processors 102A, 102B, and a physical bus interface 104 that may be configured to implement an inter-processor communication (IPC) link between the two (or more) independently operable processors.

In one exemplary embodiment, the first and second processor are connected via a bus interface. As used herein, the term "bus interface" refers to any communication system that transfers data between processors and/or peripheral components. A bus interface may include, in part or whole, hardware components (wiring, optical fiber, and other transmission mediums) and/or associated software (including communication protocols and hardware drivers.)

As used herein, an "inter-processor communication link" or "IPC link" refers to any communication bus between two (or more) processors, whether the processors are operating independently, not independently, or a combination thereof. An IPC link may include one or more data pipes that are configured to transfer data from one processor to another, for example, between a host side (e.g., root complex) and peripheral side (e.g., endpoint) of the link. A given data pipe of an IPC link may be configured to transfer the data in a unidirectional or bidirectional fashion.

As used herein, "unidirectional" relates to transmission or reception of data (e.g., instructions, packets, signals) in one direction such that the data is only configured to be transferred from a given computing entity (e.g., logic, circuitry, processor) to another computing entity, but not in the other direction (i.e., from the other computing entity back to the given computing entity).

On the other hand, "bidirectional" or "multidirectional" relates to transaction of data (e.g., instructions, packets, signals) in two or more directions such that the data may be configured to be transferred between a given computing entity (e.g., logic, circuitry, processor) to another computing entity (and vice versa).

In one implementation, the first processor 102A includes an application processor. As shown in FIG. 1, the first processor 102A is coupled to a root complex (RC) 106A which functions as the host of the IPC bus.

In one implementation, the second processor 102B includes a wireless modem. In various embodiments, the second processor 102B includes a Wi-Fi modem, cellular modem, mobile broadband modem, Bluetooth modem, NFC modem, and/or RFID reader, and/or other short-range and long-range protocols so as to include, for example, a wireless communication chipset. Other examples of wireless modems include, without limitation devices implementing e.g., IEEE Std. 802.11 (any variants thereof, including Wi-Fi and wireless local area network (WLAN)), PAN technology such as e.g., Bluetooth or IEEE Std. 802.15.4, "ZigBee", NFC or RFID, WiMAX (IEEE 802.16), WMANs, 3G cellular (e.g., Long Term Evolution/Advanced (LTE and LTE-A), WCDMA, 3GPP, 3GPP2, and GSM and improvements thereon), and ISM band devices.

In some implementations, the second processor 102B may include, e.g., a media processor or other network processing element.

As shown in FIG. 1, the second processor 102B is coupled to an endpoint (EP) 106B which functions as the peripheral of the IPC link.

As used herein, the term "memory" includes any type of integrated circuit or other storage device adapted for storing digital data including, without limitation, ROM, PROM, EEPROM, DRAM, SDRAM, DDR/2/3/4 SDRAM, EDO/FPMS, RLDRAM, SRAM, "flash" memory (e.g., NAND/NOR), and PSRAM. In some cases, the first and/or second processors may have an associated non-volatile memory (e.g., a flash memory) which is configured to store computer readable instructions, and retain the stored computer readable instructions without power. The non-transitory computer readable medium is configured to store computer readable instructions for execution. Such computer-readable instructions may alternatively or additionally be stored on a local cache associated with at least one of the processors.

As used herein, the term "buffer" refers to, for example, a device, circuit, logic, or an area of a computing environment that is used to store data temporarily. For example, buffered data may be stored until instructions are given or received to move the stored data to another entity (e.g., processor, memory, another buffer, etc.), or "flush" (empty) the buffer. The term "buffer" may be interchangeable with similar terms such as "cache," "queue," "shared memory," or "local memory" depending on the context. In some implementations, a buffer may simply be a type of memory. Examples of types of buffers may include, circular or ring buffer, FIFO (first in, first out), LIFO (latest in, first out), round robin, shortest job first, shortest remaining time, dynamic array. For example, a buffer may refer to a data structure or memory allocation, e.g., data represented by a so-called transfer descriptor (TD), completion descriptor (CD), transfer descriptor ring (TR), completion descriptor ring (CR), or any other such scheme for storing and/or organizing data. Persons of ordinary skill in the relevant art will recognize various other structures and operations related to buffering and temporary data storage.

Moreover, as used herein, "shared memory" refers to a memory device that is accessible by two or more processor apparatus. In some contexts, a "shared memory" may operate as a cache or buffer. For example, shared memory may be configured to allow a processor to write data thereto, so as to enable a different processor to read the data. In some implementations, a processor (e.g., an independently operable processor) may write so-called transfer descriptors (TDs) to a so-called transfer descriptor ring (TR) residing on the shared memory (or vice versa). Another processor (e.g., a different independently operable processor) may read the TDs on the shared memory. In some implementations, a processor may write so-called completion descriptors (CDs) to a so-called completion descriptor ring (CR) residing on the shared memory, for another processor to read. Functions of TD, TR, CD and CR will be described in greater detail below. While the foregoing envisions three separate entities (two processors and a shared memory device), artisans of ordinary skill will recognize that a given shared memory device may reside on one (or each) of the processors, and/or stand alone as an apparatus that is separate from the processors and accessible by one or more processors.

As shown in FIG. 1, both the first and the second processors (102A, 102B) are each coupled to a non-transitory computer readable medium (e.g., dynamic random access memory (DRAM) 108) and one or more memory management units (MMUs). A MMU translates virtual memory addresses (which are allocated within a processor's memory map) to physical addresses in the DRAM 108. The MMU may further be subdivided into a MMU 110A and an Input Output MMU 110B thereby allowing for the host and peripheral to have distinct memory maps (e.g., a virtual memory addresses for the host and virtual input/output (I/O) addresses for the peripheral). While the foregoing split MMU configuration is illustrated, artisans of ordinary skill in the related arts will readily appreciate that a single MMU or more MMUs (three, four, etc.) may be substituted with equivalent success.

Figure 2:
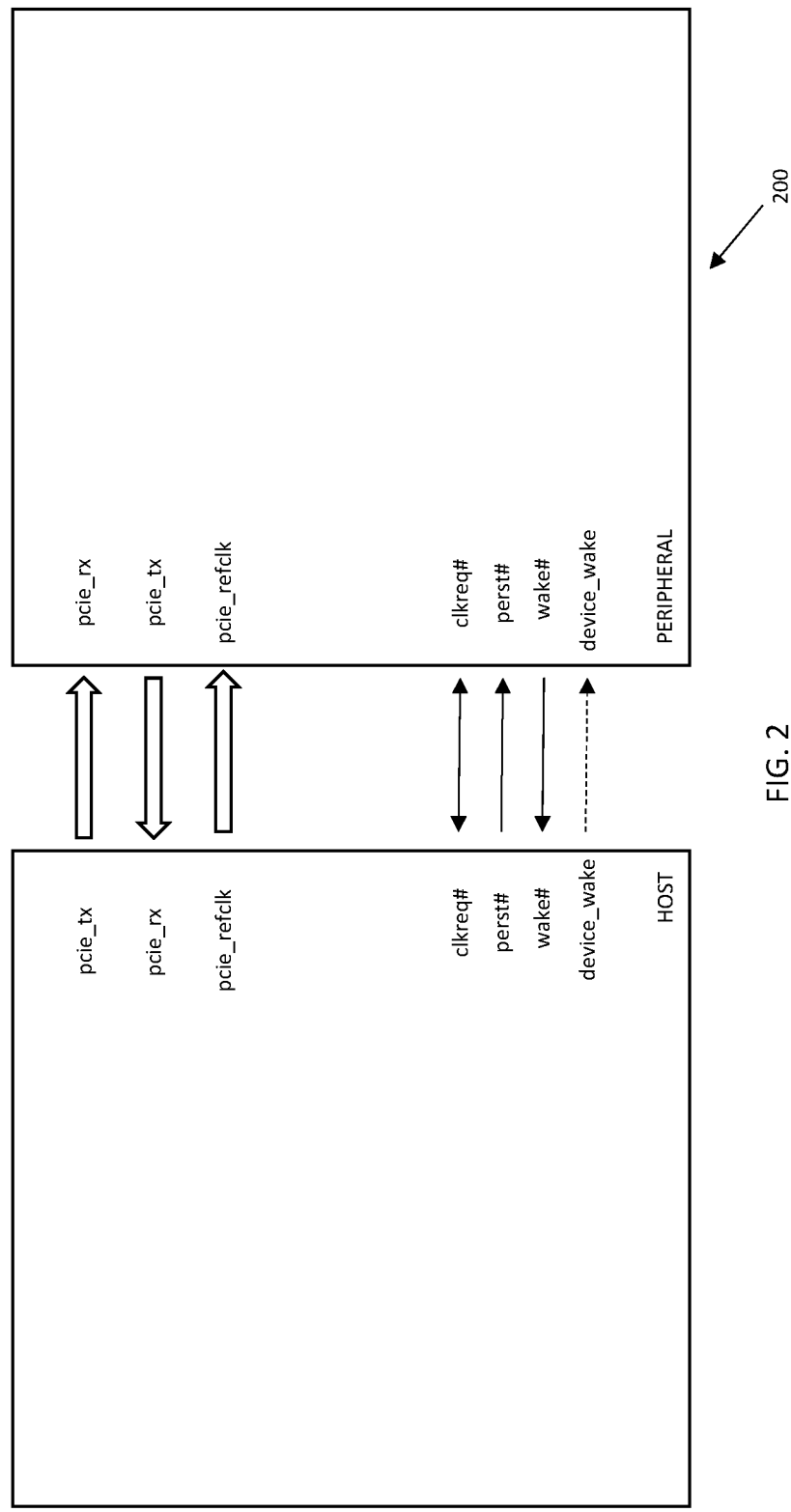
FIG. 2 is a logical block diagram of one exemplary inter-processor communications (IPC) link, useful for explaining various principles described herein.

Now referring to FIG. 2, the physical bus interface 200 includes an IPC link that may be loosely based on the Peripheral Component Interconnect Express (PCIe) standard (e.g., the aforementioned PCI Express Base Specification Revision 4.0 dated Oct. 5, 2017, incorporated by reference in its entirety). Those of ordinary skill in the related arts, given the contents of the present disclosure, will readily appreciate that other bus interface standards may be substituted with equal success.

The physical bus interface 200 may be a point-to-point communication channel between two IPC ports (the RC and EP) allowing both to send/receive access requests (configuration read/write, I/O read/write, memory read/write) and interrupts. At the physical level, a link is composed of one or more lanes (one shown in FIG. 2), each lane having receive and transmit component (e.g., pcie_rx and pci_tx). Each lane may be a full-duplex byte stream, transporting data packets in eight-bit 'byte' formats, between the RC and EP of a link, in both directions simultaneously. The physical bus interface 200 may support multiple logical links (or virtual bus interfaces) representing multiple ongoing data sessions.

Each virtual bus interface may further include one or more "sessions" which are a persistent and/or semi-persistent set of data transactions (e.g., datagrams) between two logical endpoints. The session may include "stateful" transactions (i.e., the data transactions are based on a current state of the session), and/or "stateless" transactions (i.e., the data transactions are not based on a current state of the session).

Figure 3:
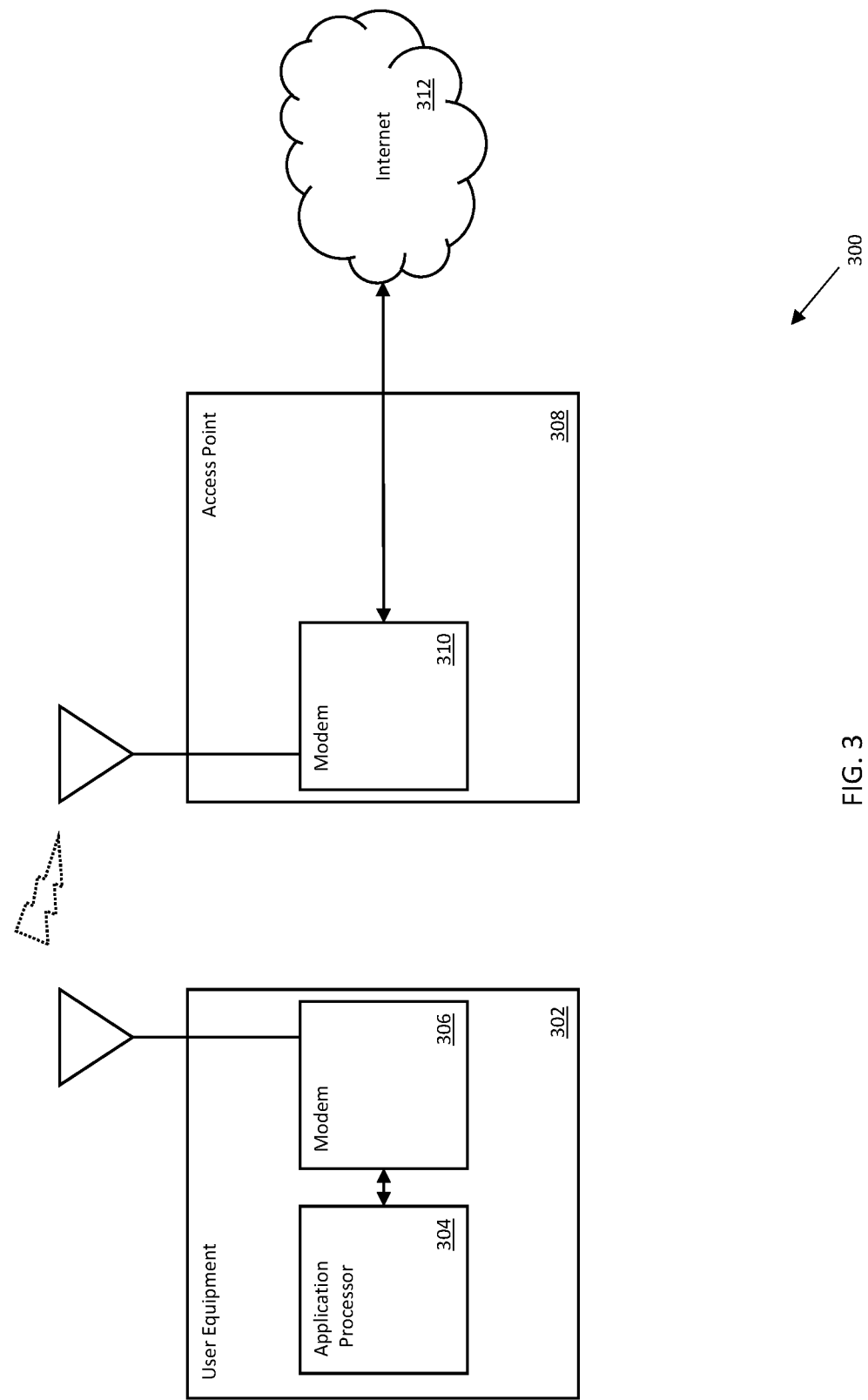
FIG. 3 is a logical block diagram of one exemplary communications network, useful for explaining various principles described herein.

FIG. 3 illustrates an exemplary network architecture 300 useful for implementing the various principles described herein. For example, the architecture 300 may include user equipment 302 that includes a host-side processor (e.g., application processor 304), a peripheral-side processor (e.g., baseband processor 306) and a shared memory module between the application processor 304 and the baseband processor 306. The application processor 304 and baseband processor 306 may include independently operable processors in data communication via an IPC link. The shared memory module may further include memory structures (including designated memory slots) for writing and reading data by the application processor 304 and the baseband processor 306 according to the principles described herein.

In some implementations, a user equipment 302 may house the independently operable processors and use the functions thereof. The user equipment 302 may be a mobile computing device or system for the consumer or end user, such as a smartphone, smartwatch, tablet, or laptop. The user equipment 302 may be configured for wireless connectivity and/or wired connectivity via at least the baseband processor 306. For example, the baseband processor may include (or be in data communication with) a wireless modem for cellular or Wi-Fi connectivity (or any other means of connectivity, such as Bluetooth, RFID, Global Positioning System (GPS)). The processors may include integrated circuits (IC) disposed on a semiconductor die for operation of the user equipment.

As shown, the user equipment 302 may be in data communication with other external devices. For example, the application processor 304 may be connected to an access point 308, by wired or wireless means, via the baseband 310 (via implementations of Wi-Fi, cellular, Bluetooth, NFC, etc.). The access point 308 may in turn enable exchange of data to and from local intranets, the Internet 312, and/or other networks including wireless networks.

The user equipment may be in data communication with a peripheral device (not shown). Exemplary peripheral devices include, but are not limited to, wireless keyboards, mice, audio equipment (e.g., earbuds, headset, speakers), home and office equipment (e.g., wireless printers), and other user equipment. In some implementations, the peripheral device may also be in data communication with other networks or devices (e.g., the access point and/or e.g., intranets, the Internet, etc.) to receive and send data.

The data generated by the application processor 304 may be exchanged via the baseband processor 306 and sent "upstream" to the access point 308, or the data may be transmitted from the access point "downstream" to the application processor 304 via the baseband processor 306. Each of the application processor and the baseband processor may generate its own data for the other processor(s) to process. Furthermore, each of the processors may transmit (and/or receive) related data represented by or encapsulated directly in transfer descriptors (TDs) and/or completion descriptors (CDs), as will be detailed further herein.

Transfer and Completion Operation

Figure 4:
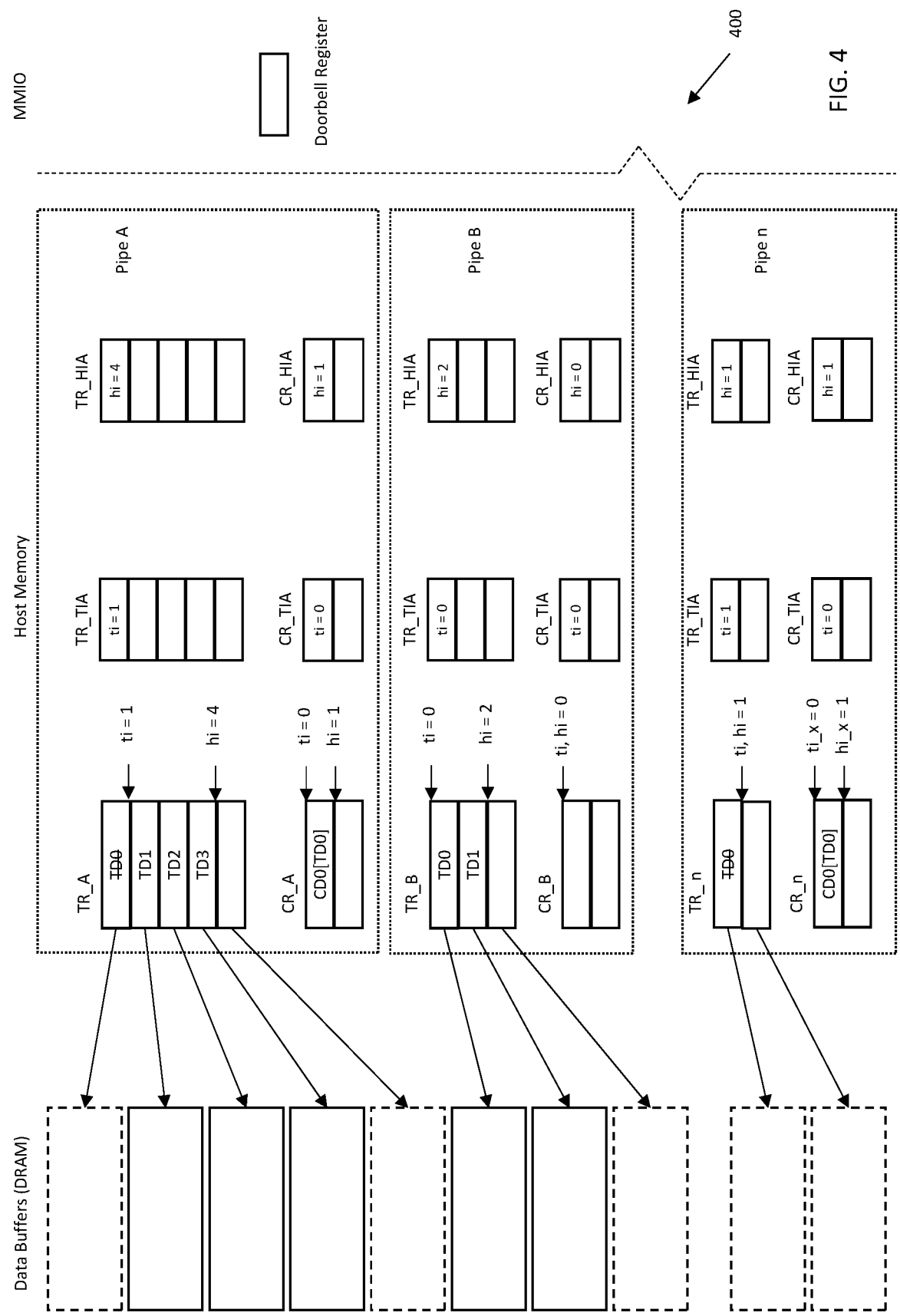
FIG. 4 is a logical block diagram of data structures used according to one data transfer technique.

Referring now to FIG. 4, various data structures useful for illustrating one data transfer and completion technique are depicted. The described memory structures may reside within a host processor memory; however, artisans of ordinary skill in the related arts given the contents of the present disclosure will recognize that the aspects are not so limited. The various data structures (e.g., index arrays and/or memory buffers) may be located on the host-side and/or peripheral-side memory, respectively. In other variants, some or all of the data structures may be located on a shared memory and/or in any other memory accessible by both the host and peripheral processors.

In one such implementation, input and output (I/O) data flows over "pipes" in the uplink (UL) and/or downlink (DL) direction. As used herein, the term "uplink" refers to transfers from the application processor to the baseband processor, and the term "downlink" refers to transfers from the baseband processor to the application processor. An interface may have any number of uplink pipes and any number of downlink pipes; however, an interface includes at least one pipe. During operation, each software process (e.g., control, data, debug, or other client service) is associated with a single interface.

As shown, multiple distinct "pipes" (Pipe A, Pipe B, . . . Pipe n) transact "data flows" between the application processor and the baseband processor. As a brief aside, so-called transfer descriptor rings (TRs) can be created by "opening" a pipe, and destroyed by "closing" the pipe (e.g., incident to a software process of one processor attempting to communicate to a peer software process of another processor). Common examples of parameters that can be used to open a data pipe, include without limitation e.g., type of pipe, address, number of entries, identification, index vector, header size, footer size, doorbell vector, priority, traffic class, interrupt vector, and or any number of other data structure specific information. For example, a TR opening message may include: a buffer size ring address, a buffer size ring entry width, a buffer size ring entry chain, completion type and/or ID, etc.

An IPC link may include at least one pair of unidirectional pipes. In some variants, the IPC link may alternatively or additionally include at least one pair of bidirectional or multidirectional pipes. For example, one processor may be in data communication with a plurality of other processor apparatuses via one or more IPC links. In some implementations, the host may be connected to multiple peripheral processors. In other implementations, multiple host processors may be connected to a given peripheral processor. More generally, any number of hosts and any number of processors may be connected together according to the aforementioned IPC bus.

Each "pipe" may be associated with one or more "transfer descriptor rings" (TRs). Each TR is composed of transfer descriptors (TDs). The TR may be described by a TR head index array (TR_HIA) and a TR tail index array (TR_TIA). Each TR_HIA entry indicates the start of the next available TD, and the TR_TIA indicates the next TD to process. Transfers may be from the host to the peripheral, or vice versa. The host writes a head pointer that points to the next empty slot in the TR that the host will process, whereas the tail pointer points to the address of the next TD which the peripheral processor will process. The head pointer may be written by the host and read by the peripheral. The tail pointer may be read by the host and written by the peripheral. In some variants, multiple TRs can be used to enable scatter-gather behavior for large I/Os (i.e., non-contiguous memory accesses).

As shown in FIG. 4, a host writing to the peripheral creates an "uplink" pipe. When the head pointer of the TR is equal to its tail pointer, the TR is empty. For example, TR_HIA[0] for Pipe A is set to 4; thus, the host can write a new TD at index location 4. Similarly, TR_TIA[0] for Pipe A is set to 1; thus, the peripheral can read and process the TD at index location 1. In another example, a host reading from the peripheral creates "downlink" pipe by pre-queuing empty buffers. For example, the buffer described by TR_TIA[0] for Pipe B is set to 0, thus the host can pre-queue two empty downlink buffers by writing TR_HIA[0] for Pipe B to 2. The peripheral writes valid data into the empty buffers and update the TR_TIA[0] accordingly. In the aforementioned implementation, the semantics of TR_HIA and TR_TIA between uplink and downlink pipes are identical (irrespective of directionality), however other implementations may vary semantics for various other purposes (e.g., to optimize communications for asymmetric uplink/downlink usage, etc.)

Each transfer descriptor (TD) references a corresponding backing data buffer. In some implementations, a single TD may describe a physically contiguous memory buffer, accessible by the host and/or the peripheral processors over the communication link. The contiguous memory buffer may be addressed as a contiguous space in one or both of the virtual MMU and/or IO MMU address spaces as well. A TD may include various fields, such as the type of the descriptor, size of the buffer, address of the buffer, tag unique to the buffer described by the TD, remaining count indicating the number of TDs remaining in a packet transfer, a header with information at the beginning of the TD, or a footer and/or a header field containing data such as metadata or data associated with each TD.

In various implementations, the data included in the TD may broadly refer to a payload for delivery to the another processor or another device. Artisans of ordinary skill in the related arts will readily appreciate that a "payload" as used herein broadly refers to a portion of transmitted packetized data that includes a message. The payload may exclude protocol information used for, e.g., routing the message, error correction, flow control, and other transactional overhead. For example, in addition to the payload, a data packet (including, e.g., a transfer descriptor) may include metadata or other fields sent solely to facilitate the delivery of the payload. In another example, the payload may be included with a segment of a packet that is typically not used for payload delivery, such as a header or footer component of a transfer descriptor.

As a brief aside, there are a wide variety of "data types" used in the computing arts. As used herein, "data types" refer to specific formats or constructions of data that can be classified and/or used by logic (e.g., hardware, firmware, compiler or software, processor, programmable logic, etc.) to identify how the data is being used. Data types are not limited to "natively" understood data types or generic data types; some data types may be dynamically defined in software, and specialized or specifically designed for a particular function or operation.

So-called "value" data types are data types that signify one or more values to the compiler. Common examples of value data types include, without limitation: Booleans, characters, integer numbers, floating-point numbers, and fixed-point numbers. Another family of commonly used data types are so-called "reference" data types; reference data types are interpreted by logic to "refer" to other data. Common examples of reference data types include without limitation, references and pointers. Some hybrid data types may take on the characteristics of either value or reference data types, depending on how they are handled by the logic; such hybrid data types include, without limitation: arrays, multi-dimensional arrays, lists, dictionaries, sets, stacks, queues, and enumerations. For example, a list may be treated as a value and compiled "in-line" (e.g., a compiler copies list values at each instance of the list), or treated as a reference (e.g., the complier references a memory location for each instance of the list).

Within the context of the present disclosure, as used herein, the term "pointer" refers to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "descriptor" refers to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security based information (e.g., cyclic redundancy checks (CRC), parity, etc.).

As used herein, a "footer" component refers to data associated with, and following, a data structure or a portion thereof (e.g., a transfer descriptor, completion descriptor). As used herein, a "header" component refers to data associated with, and preceding, a data structure or a portion thereof (e.g., a transfer descriptor, completion descriptor). A header or footer may be an optional component of a transfer descriptor or a completion descriptor. Similarly, a header or footer may include data (e.g., a payload) or metadata that describes the descriptor, packet, and/or payload.

The TD/TR data structure enables independent queue processing for both the host and peripheral processors. For example, the peripheral can read from one area of memory described by a first TD while the other host writes to a different area of memory to prepare a different TD. Processing may be performed on a, e.g., best-effort, prioritized, round robin, weighted round robin, or any number of other ordering basis. In some cases, TDs may be queued and/or flushed according to ongoing flow control and/or other bandwidth management. Various other schemes for TD processing will be readily appreciated by those of ordinary skill, given the contents of the present disclosure, for example, as used for the various data transmission schemes over an IPC link as described in U.S. patent application Ser. No. 15/865,638 entitled "METHODS AND APPARATUS FOR REDUCED-LATENCY DATA TRANSMISSION OVER AN INTER-PROCESSOR COMMUNICATION LINK BETWEEN INDEPENDENTLY OPERABLE PROCESSORS" and filed Jan. 9, 2018, incorporated herein by reference in its entirety.

Referring back to FIG. 4, each pipe may further be associated with one "completion descriptor ring" (CR). Each CR may be composed of completion descriptors (CDs). The CR is described by a CR head index array (CR_HIA) and a CR tail index array (CR_TIA). Each CR_HIA entry indicates the start of the next available CD, and the CR_TIA indicates the next CD to process. Completions are from the peripheral to the host (in response to transfer descriptors). In other words, the head index points to the next empty slot in the CR that the peripheral will process, whereas the tail index points to the next CD that the host processor can process. For example, CR_HIA[0] for Pipe A is set to 1; thus, the peripheral will provide the next CD at index location 1. Similarly, CR_TIA[0] for Pipe A is set to 0; thus, the host can process the CD at index location 0.

During operation, the peripheral processor reads the TDs from the TR, and retrieves or writes data referred by or contained therein. However, the peripheral processor may process the TDs/TR according to its own internal considerations (rather than relying on the host processor's task scheduling). Once the peripheral processor has completed processing, it determines completion status, and writes the status to the CDs/CR, thereby providing explicit completion status information to the host processor. The CDs contain completion information that indicates to the host processor (the processor that originated the TDs) that the data has been processed by the peripheral processor and that the memory allocation for the TD/TR can be freed. For example, CD0 indicates that TD0 has completed. As a result, the memory allocation for TD0 can be freed and reclaimed for subsequent data transactions.

Completion mechanisms enable multiple processors to coordinate by explicitly acknowledging when data has been e.g., transmitted, rendered, consumed, and/or otherwise processed. Such information can be used to support low-latency transactions, reduce and/or substantially eliminate waiting or confirmation times, and/or improve the speed of operation between independently operable processors.

Figure 5:
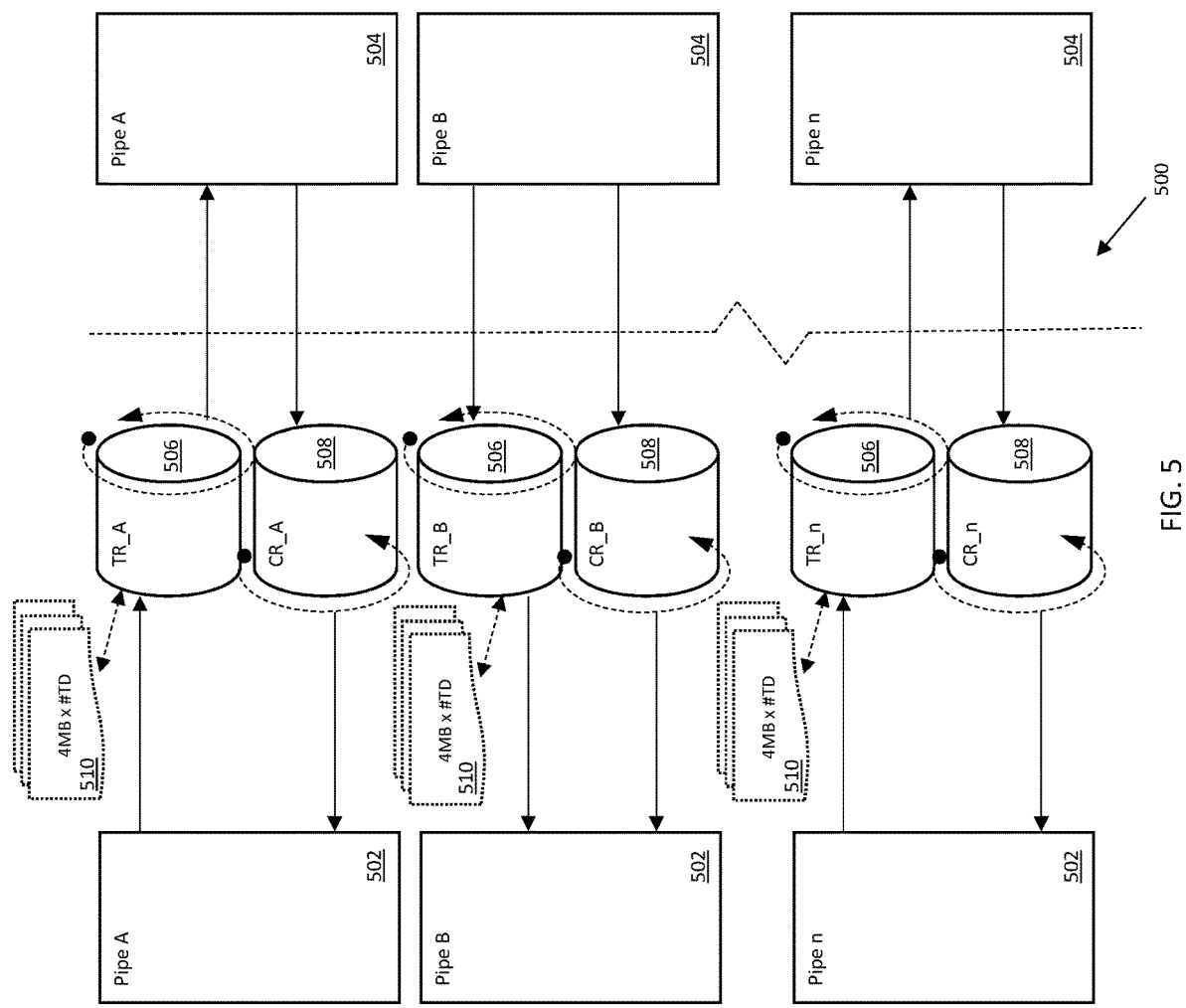
FIG. 5 is a graphical representation of data transfers according to one data transfer technique.

FIG. 5 is a logical representation of data transfers via an inter-processor communication (IPC) link according to the aforementioned technique. As shown, a host has opened multiple pipes 502 (Pipe A, Pipe B, . . . Pipe n); the pipes directly correspond to peripheral pipes 504. Each pipe provides data transfer via a transfer descriptor ring (TR) 506 (TR_A, TR_B, . . . TR_n). Each pipe also includes a corresponding circular completion ring (CR) 508 (CR_A, CR_B, . . . CR_n). As previously alluded to, each TR is pre-allocated backing memory 510. In one such implementation, each TD of the TR is allocated a backing memory buffer of up to 4 MB (megabytes), thus the total memory allocation for each TR is 4 MB×# TD. For example, a TR that is composed of 32 TDs is pre-allocated 128 MB of backing memory. In other implementations, TDs may be pre-allocated other memory sizes (for example, a TD may be allocated more or less than the 4 MB size).

As previously alluded to, the data flows corresponding to the peripheral data pipes 504 are directly connected to the host data pipes 502 via an individual TR. As a result, the data flow retains its sequential ordering through transit. More directly, the data flow entering the TR is identical to the data flow exiting the TR in the aforementioned data transfer scheme of FIG. 5.

In the illustrated implementation Pipe A is an uplink transfer for a corresponding upstream transmission (e.g., to an external network). In contrast, Pipe B is a downlink transfer (e.g., data received via the external network). Artisans of ordinary skill in the related arts will readily appreciate, given the contents of the present disclosure, that pipes may be any permutation of unidirectional, bidirectional, uplink and/or downlink.

As previously alluded to, consumer electronics devices are designed to support a mix of many different software applications. For example, the iPhone® (manufactured by the Assignee hereof) commonly includes both native applications as well as 3rd party applications. For a variety of reasons (e.g., security, privacy, etc.), software applications are generally unaware of other concurrently executed software applications. Additionally, resources that are allocated to one interface cannot be used by other interfaces; in other words, a pre-allocated memory resource is "dedicated" to only that interface for the duration of the pipe. Thus, for example, Pipe A is allocated TR_A, its associated TDs, and backing memory for its lifetime; these resources are blocked and cannot be re-assigned until Pipe A is closed.

In practical implementations, an interface may open a software pipe without knowledge and/or regard to the overall system burden. For example, an interface of a software application may open a pipe and request more resources than it actually needs. Not only are the pre-allocated memory resources underutilized, but additionally pre-allocated resources cannot be allocated to other interfaces and/or applications. As a result, the device's memory may be inefficiently used, and other interfaces and/or applications may be starved for memory. Within the limited resource context of mobile devices, this is highly undesirable.

Example Operation

Figure 6:
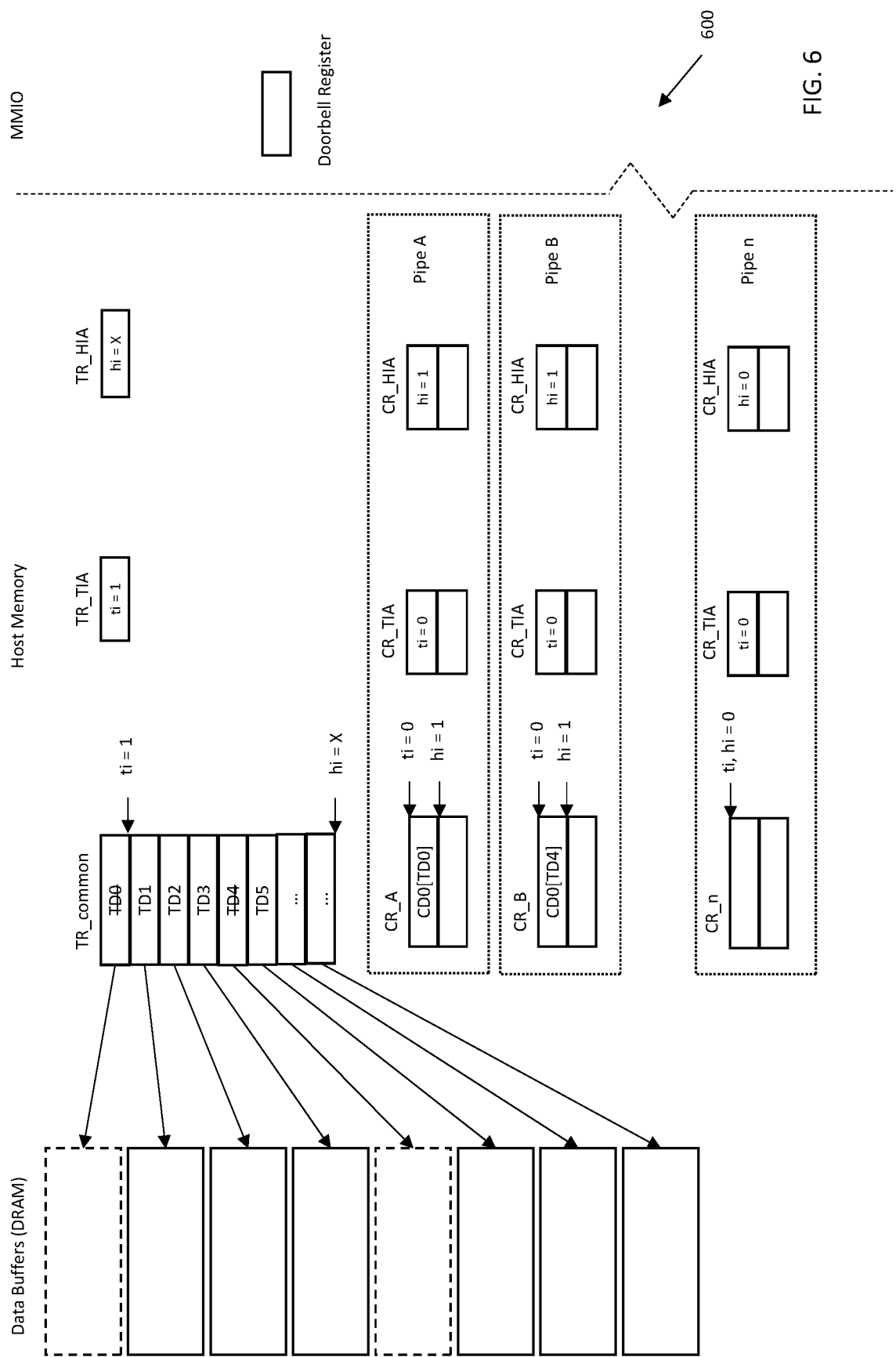
FIG. 6 is a logical block diagram of exemplary data structures used to transfer data in accordance with the various principles described herein.

Referring now to FIG. 6, various data structures useful for illustrating exemplary memory efficient data transfers are shown. Unlike the aforementioned data structures (e.g., as described in FIGS. 4 and 5 supra), the system 600 of FIG. 6 multiplexes distinct data flows over a common transfer descriptor ring (TR). In one exemplary embodiment, there is no affinity between data pipes and data flows during multiplexing/de-multiplexing. The host memory management entity allocates TDs from a common pool to transfer data flows for each individual data pipe.

During operation, a memory management entity tracks how data flows are multiplexed into and de-multiplexed from the TDs. Rather than tracking data flow statuses with dedicated individual transfer descriptor rings (TRs) of data pipes, each data flow is associated with only a dedicated completion descriptor ring (CR). For example, as shown, the data flow corresponding to Pipe A is associated with completion ring CR_A; the data flow corresponding to Pipe B is associated with completion ring CR_B; etc. As data flows complete, the pipes are apprised of processing via their corresponding CR. For example, CR_A includes a CD that conveys the completion status for the data flow of Pipe A (which was carried via TD0), similarly CR_B includes a CD that conveys the completion status for the data flow of Pipe B (which was carried via TD4). In some implementations, the pipes directly read the CDs for status information. In other implementations, the pipes do not directly access the CDs but receive completion information from the host memory management entity (e.g., the data pipe does not have visibility into its data flow's TD/TR and/or CD/CR allocation).

More directly, by decoupling data flows from dedicated TRs, the system can allocate a fixed set of backing memory resources for a common TR to support bus transfers. Applications can dynamically open and close as many pipes as needed without interfering with the IPC memory resources. Moreover, as soon as a TD is consumed and completed, it can be freed and re-released into the shared set of common TDs; in other words, the common pool of TDs can be rapidly re-allocated to other data flows.

Figure 7:
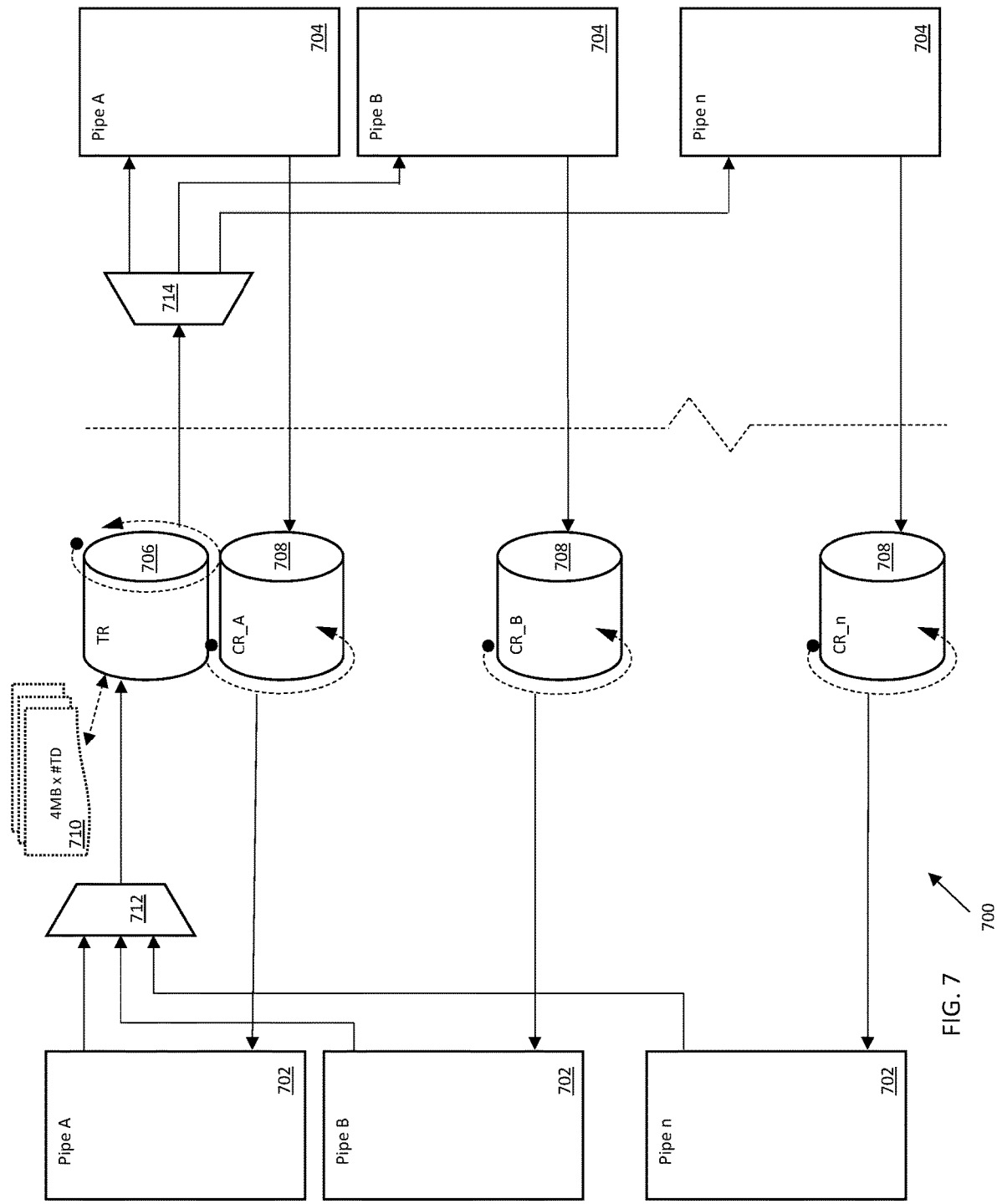
FIG. 7 is a graphical representation of data transfers in accordance with the various principles described herein.

FIG. 7 is a logical representation of exemplary data transfers via an inter-processor communication (IPC) link. As shown, a host has opened multiple pipes 702 (Pipe A, Pipe B, . . . Pipe n); as before the host pipes 702 directly correspond to peripheral pipes 704. In one exemplary embodiment, the data flows corresponding to the peripheral data pipes 704 are multiplexed into a common transfer ring 706 (which has no data pipe affinity). The data flows are then reconstituted for the host data pipes 702.

In one implementation, the host and peripheral data pipes guarantee delivery of data according to the data flow sequencing. In other implementations, the host and peripheral data pipes may not always deliver all data of the data flow or may re-arrange data flow sequencing; for example, some data may not be delivered due to delivery timeouts, bandwidth limitations, etc. More generally, the host and peripheral data pipes may support out-of-sequence or lossy delivery for some applications.

Each data flow may be multiplexed over a common circular transfer ring (TR) 706. Each data flow may be associated with a corresponding individual completion ring 708 (CR_A, CR_B, . . . CR_n). In the illustrated implementation, one head index array and tail index array describes the common TR. Artisans of ordinary skill in the related arts given the contents of the present disclosure will readily appreciate that other implementations may use multiple common transfer rings (described in greater detail hereinafter).

In the illustrated implementation, Pipes A, B n, etc. are downlink transfers from a downstream transmission. Artisans of ordinary skill in the related arts will readily appreciate, given the contents of the present disclosure, that the aforementioned pipes may be any permutation of unidirectional, bidirectional, uplink and/or downlink.

As shown therein, the common TR 706 pre-allocates backing memory 710. In one such implementation, the total memory allocation is determined based on overall system parameters and does not vary during operation. For example, the common TR 706 may be instantiated with a fixed amount of transfer memory divided into a number of predetermined TDs.

Figure 8A:
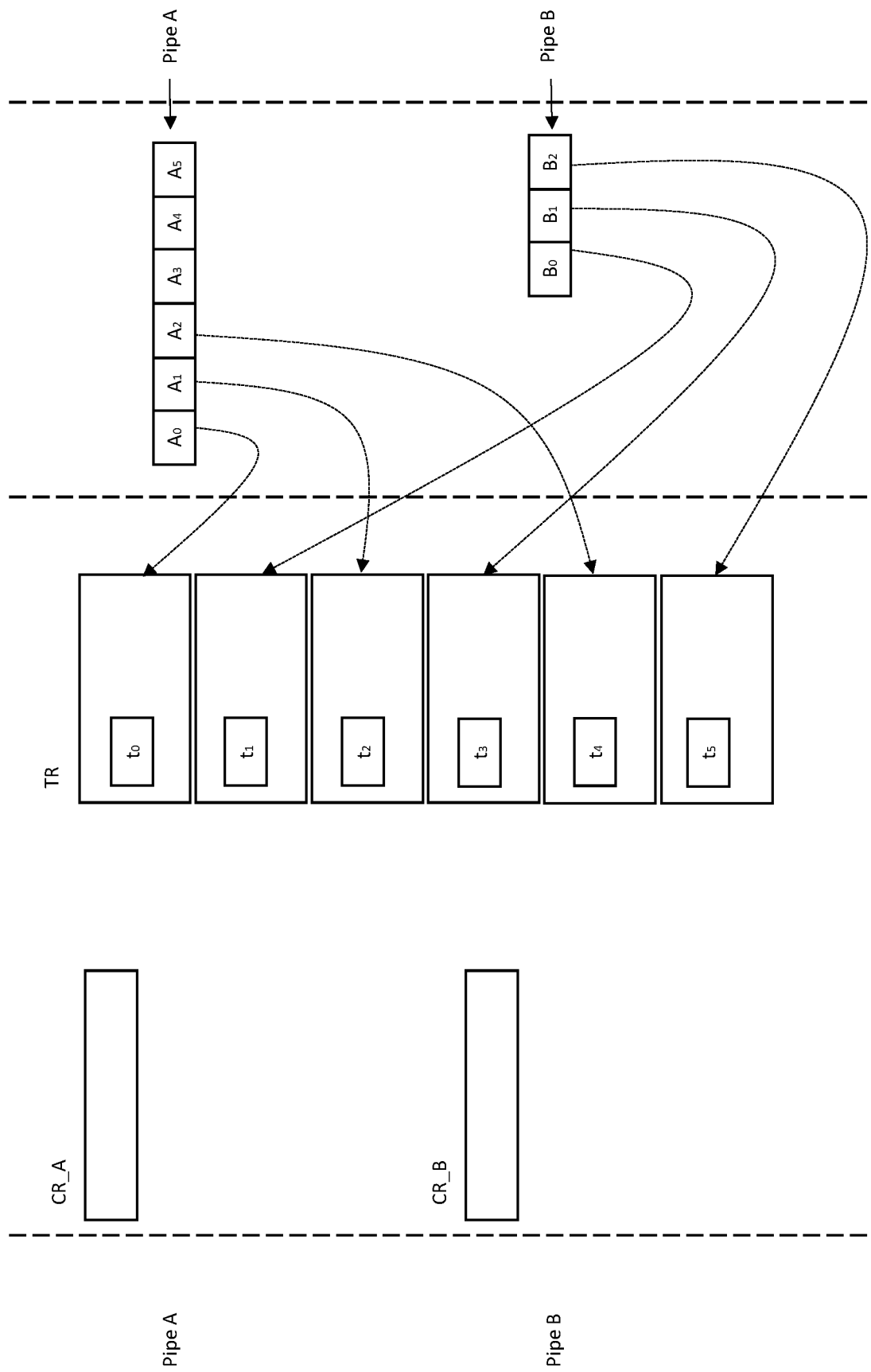
FIGS. 8A-8D are graphical representations of various stages of an exemplary simplified data transfer via a common transfer descriptor ring (TR) in accordance with the various principles described herein.

Multiplexing logic 712 and de-multiplexing logic 714 coordinate to assign data flows of the data pipes to the pool of common TDs of the common TR 706. A variety of different techniques may be used to schedule and/or multiplex data flows. For example, referring now to FIG. 8A, one simplified data multiplexing of two flows (the data flow ($A_N$) of Pipe A and the data flow ($B_N$) of Pipe B) into a common transfer descriptor ring (TR) is depicted. A memory management unit (MMU) (not shown) subdivides data for each data flow into a number of records for transaction via the common TR. As shown therein, Pipe A's downlink data stream is subdivided into six records ($A_0$, $A_1$, $A_2$, $A_3$, $A_4$, $A_5$); Pipe B's downlink data stream is subdivided into three records ($B_0$, $B_1$, $B_2$). The initial allocation uses a "fair" round robin scheme, where the transfer descriptors (TDs) of the common TR are assigned to the records in equal portions and in circular order, handling all data flows without priority. Since, only a subset of the Pipe A records can be transferred ($A_0$, $A_1$, $A_2$), the non-transferred records (3-5) remain in queue. In this example, all of Pipe B's records ($B_0$, $B_1$, $B_2$) are transferred.

In one exemplary implementation, the pipes do not have any affinity to the TDs. Instead, each TD is uniquely identified by a tag. For example, the first record of Pipe A ($A_0$) is written into a TD of the common TR. The TD is identified by a unique tag (e.g., $t_0$). These tags are used for CD/CR signaling (as described in greater detail infra.)

While the fair round robin scheme is shown for clarity, unfair and/or lossy multiplexing/de-multiplexing may be used as well. For example, prioritizing the data flow for Pipe A over Pipe B would result in allocating all TDs for the six records ($A_0$, $A_1$, $A_2$, $A_3$, $A_4$, $A_5$). Similarly, lossy schemes could allow for evenly (or uneven) split loss (e.g., $A_0$, $A_1$, $B_0$, $A_3$, $A_4$, $B_2$ punctures each data flow by the same 2/3 ratio.) Various other techniques may be substituted with equivalent success by those of ordinary skill in the related arts given the contents of the present disclosure.

Figure 8B:
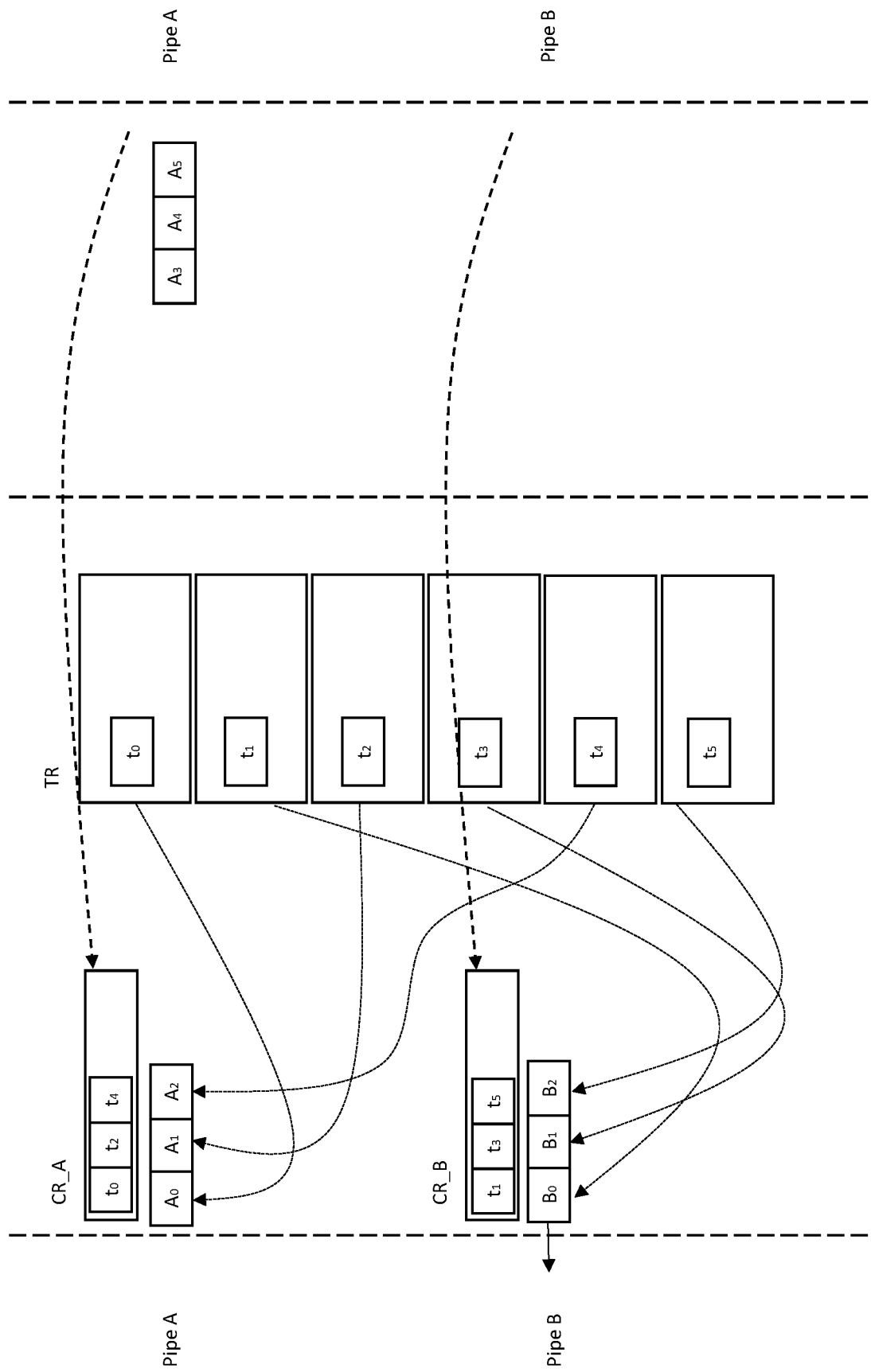

FIG. 8B illustrates one simplified data de-multiplexing of the common transfer descriptor ring (TR). As shown therein, completion records for both CR_A and CR_B are provided for their respective portions; the completion records identify the corresponding TDs by the aforementioned tag identity (e.g., CR_A receives completions for tags $t_0$, $t_2$, $t_4$). Thereafter, the host processor can retrieve the TDs that are associated with the corresponding tags and reconstruct the pipe data accordingly. As previously noted, the pipes do not have any affinity to the underlying buffers (e.g., Pipe A does not have visibility into which TDs were allocated for transfer).

The records are de-multiplexed in a complementary sequence to their multiplexed sequence. In other words, Pipe A receives its subset of transferred records (0-2), while Pipe B receives all of its records (0-2) in a fair round robin scheme. Since all of the records for Pipe B have been received, the Pipe B data flow can be reassembled and delivered (e.g., to higher layer networking, etc.). As noted above, the fair round robin scheme is shown for clarity, however unfair and/or lossy multiplexing/de-multiplexing would operate in similar fashion.

Figure 8C:
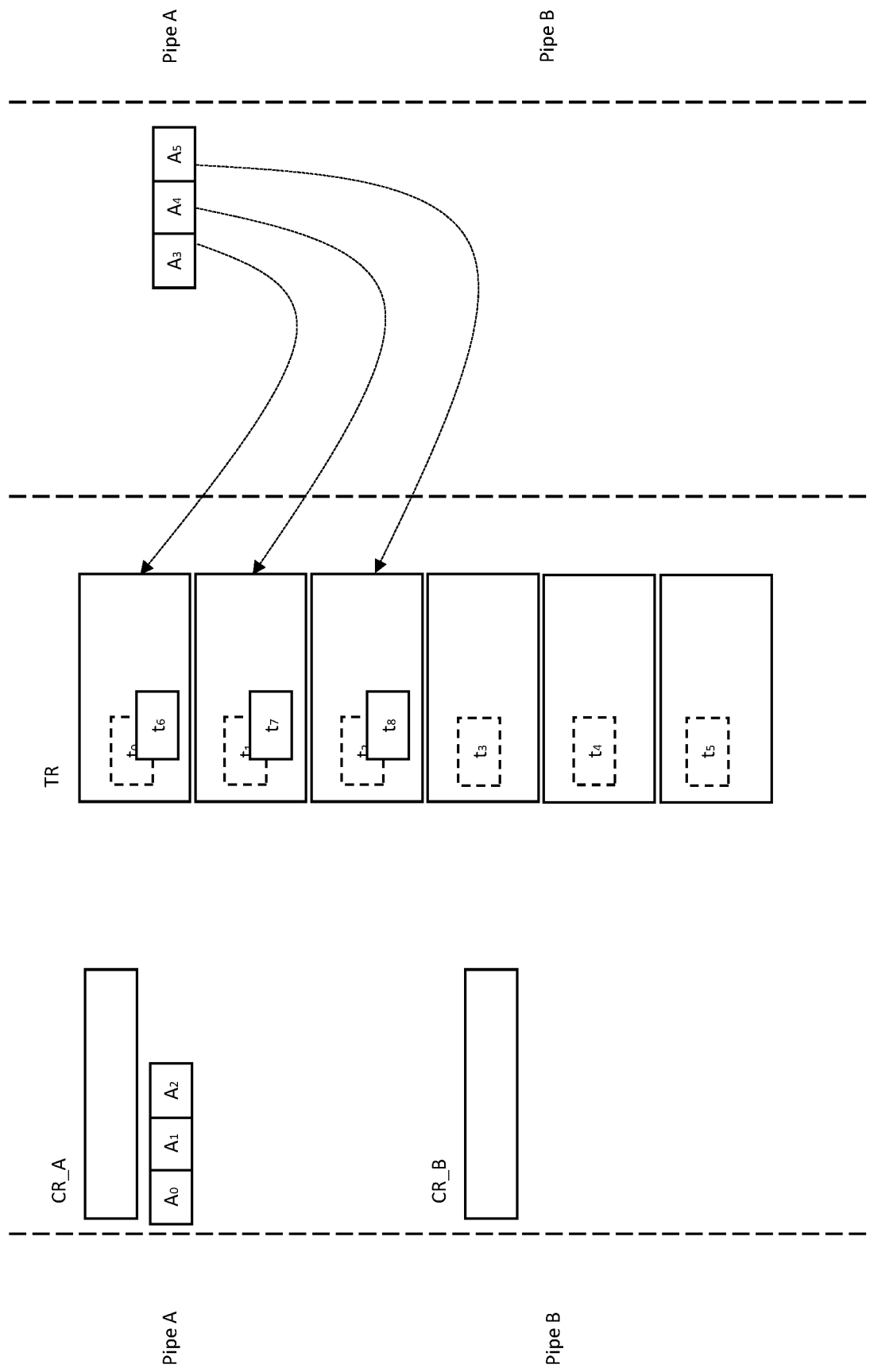

Referring now to FIG. 8C, once the host has retrieved records based on their corresponding completion status, the host updates the head index for the common TR thereby freeing the allocated TDs. Specifically, the TDs of the common TR are freed for re-allocation by the host for e.g., the remaining downlink transfers. In the illustrated example, the remaining records of the Pipe A data flow ($A_3$, $A_4$, $A_5$) can be queued for transfer (there are no remaining Pipe B data flow records).

Figure 8D:
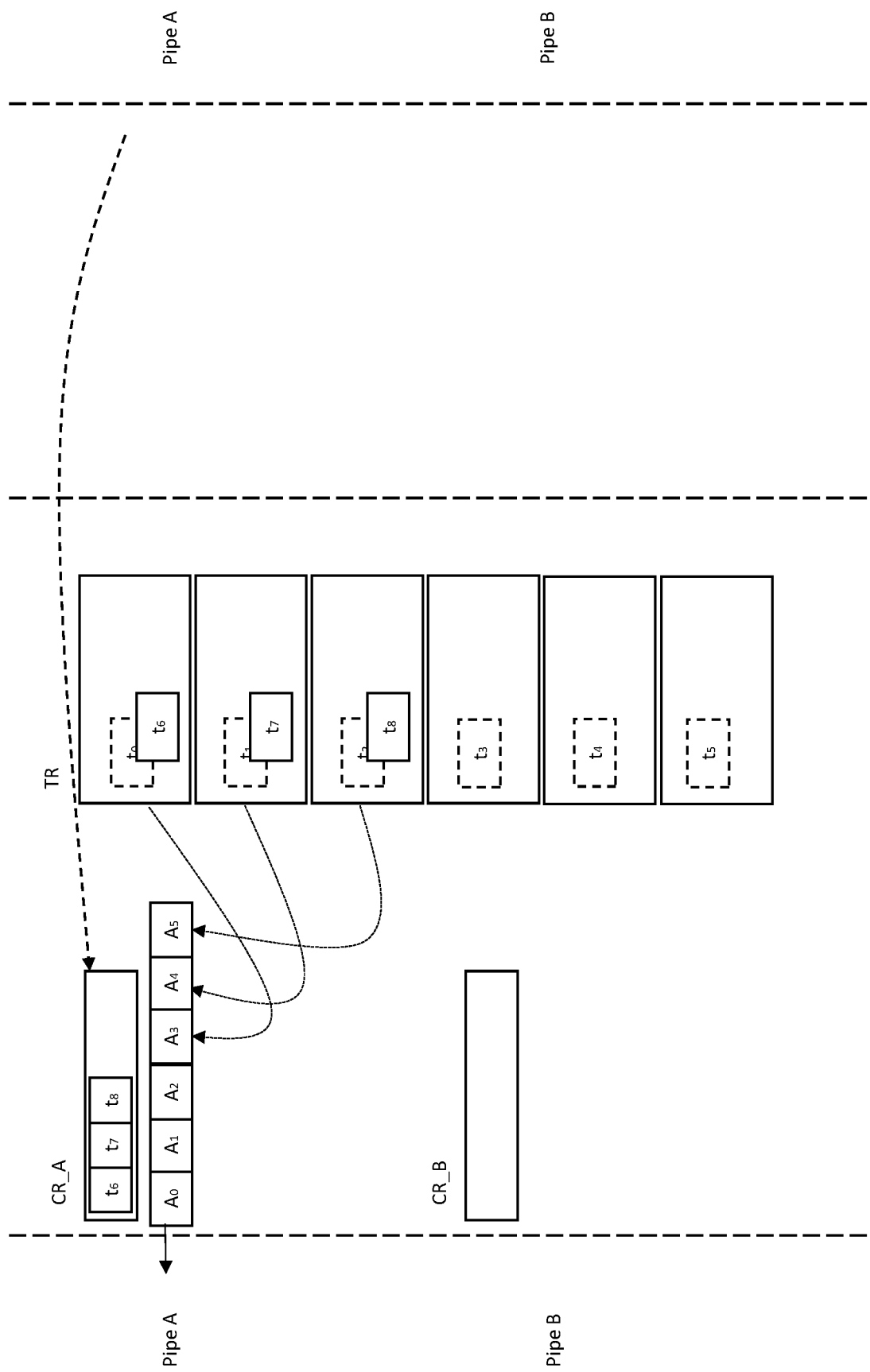

Subsequently thereafter, in FIG. 8D the peripheral provides the completion descriptors for the remaining records. Responsively, the host can retrieve the remaining records, and reconstruct the Pipe A data flow.

Methods

Figure 9:
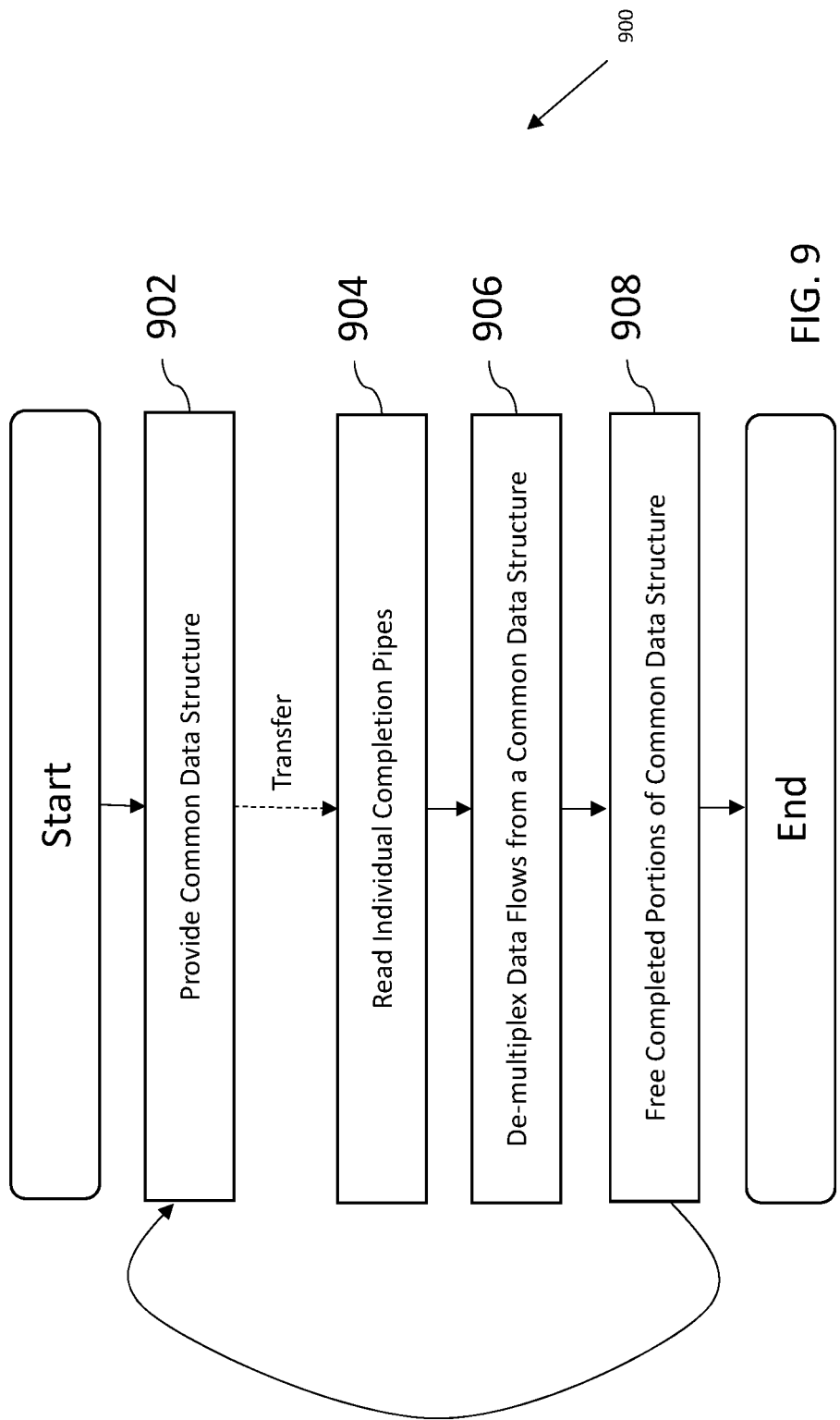
FIG. 9 is a logical flow diagram of one generalized method for de-multiplexing data flows between multiple processors over a common data structure, in accordance with various aspects of the present disclosure.

FIG. 9 illustrates a generalized method 900 for de-multiplexing data flows from a common data structure. In some implementations, one or more data flows are multiplexed via a single transfer ring.

At step 902 of the method 900, a common data structure is provided to another processor. For example, the common data structure is allocated empty and provisioned to be filled with data (e.g., a read access). As but another example, the common data structure is provisioned with data (e.g., a write). Still other implementations may allow for bi-directional transfers (e.g., reads and writes).

The provisioning may be implied to the second processor. For example, the first processor may write to an array. In one such implementation, the first processor writes to a head index array and/or a tail index array that identify one or more transfer data structures. The head and/or tail index array points to the locations within common data structure that are free (empty or otherwise suitable for writing over) for transfer. The second processor can infer, based on changes to the pointer arrays, that new data structures are available for transfer. In another implementation, the first processor writes to a head index array and/or a tail index array that identify one or more completion data structures. The head and/or tail index array points to the locations within a common data structure that have/have not yet been completed (e.g., which still have data for transfer). The second processor can infer, based on changes to the pointer arrays, that new data structures are available for transfer.

In other implementations, the provisioning of the common data structure may include allocating in whole, or in part, the common data structure to a shared memory. In still other implementations, the provisioning of the common data structure may include allocating in whole, or in part, the data structure to a buffer memory. In another such implementation, the provisioning of the common data structure may include allocating in whole, or in part, the data structure to the second processor's memory.

In still other implementations, the provisioning of the common data structure may include a physical bus access (e.g., writing over a data bus). In some such variants, the provisioning of the common data structure may be performed over a memory bus. In other such variants, the provisioning may be performed over a serial bus. In still other variants, the provisioning may be performed over a parallel bus.

In some implementations, the provisioning may include an explicit notification signaling. For example, the first processor fires an interrupt for the second processor or rings a "doorbell" signal. In another example, the first processor may write to a general purpose input output (GPIO). In still other examples, the first processor may write to one or more registers or other defined memory locations.

As used herein, the term "common" refers to a resource that is shared, in whole or part, by multiple processes. For example, a single transfer ring (TR) is aggregates data flows from multiple data pipes. Other examples of a common resource may include without limitation: buffer, queue, cache, FIFO, LIFO, heap, array, matrix, hash table, linked list, and/or any other allocable memory resource.

Artisans of ordinary skill in the related arts will readily appreciate, given the contents of the present disclosure, that the principles described herein are not limited to single transfer rings. In some embodiments, multiple common TRs may be used for a variety of reasons. Consolidating ring data structures may be useful wherever different subsets of applications can share pools of common ring resources. Thus, different TRs may be characterized by different features, capabilities, and/or applications. For example, a high priority TR can be used to multiplex all high priority flows, a low priority TR can be used to multiplex the remaining flows at a lower priority. In another such example, a high throughput TR can be used to multiplex data flows that transact data in bulk, a low latency TR can be used to multiplex flows which need immediate delivery. In still another such example, different TRs can be associated with different buffer sizes; for example, one TR use 2 kB buffers, whereas a second TR can point to 8 kB buffers. Still other variants of the foregoing may be substituted with equivalent success, given the contents of the present disclosure.

More generally, artisans of ordinary skill in the related arts will readily appreciate that allocating a fixed pool of resources may be used in a variety of different load balancing and/or prioritization schemes. Within the context of the present disclosure, the pool of TDs that are allocable from each TR may be used to constrain overall bandwidth between the processors within reasonable limits. Unlike prior art solutions which dynamically created and pre-allocated memory space for each data pipe individually, the disclosed embodiments can only request resources from a fixed pool that doesn't belong to any data pipe. In other words, outstanding requests are queued (rather than immediately serviced with a new memory allocation), thus overall bandwidth remains constrained regardless of the number of data pipes that are opened and/or closed.

In some implementations, the common data structure is not created or destroyed with the opening or closing of a data pipe. In one embodiment, the common data structure may be created, modified, or destroyed based on one or more aspects of the physical bus interface.

In some variants, the physical bus interface is statically allocated a common data structure. In some cases, the static allocation is pre-defined based on e.g., known capabilities of the device. For example, a host and peripheral may have a maximum supportable communication bandwidth, power consumption, memory capacity, and/or other design constraint.

In other variants, the physical bus interface is allocated a common data structure that dynamically changes. For example, a physical bus interface that has a known bandwidth can dynamically adjust a correspondingly sized common data structure based on e.g., an assumed rate of filling, emptying, buffering time, etc. In other words, the physical bus interface may dynamically change its bandwidth and by extension its common data structure. For example, a physical multi-lane bus interface may be able to dynamically enable or disable one or more lanes; e.g., increasing the number of lanes from one to two may be handled with a corresponding doubling of the backing common data structure. Further increasing the number of lanes from two to three can be handled with a commensurate 50% increase, etc. Similarly, where the physical bus interface is completely powered down, no corresponding common data structure is required and the existing common data structure may be reclaimed (in whole or part).

Other considerations for sizing the common data structure may include without limitation e.g., memory, processing complexity, bandwidth, power consumption, etc. For example, a common data structure may be conservatively sized (under the assumption that one or more data pipes may be emptied at a slower rate than they are filled), alternatively a common data structure may be aggressively sized thereby forcing pruning processes to ensure that only high priority traffic is transferred. Various other implementations may be substituted with equivalent success, given the contents of the present disclosure.

Various other techniques for provisioning of a common data structure will be readily appreciated by those of ordinary skill in the related arts given the contents of the present disclosure.

Subsequent to (the second processor) processing the transfer data structure, the first processor is notified of transfer status via one or more individual completion pipes (step 904 of the method 900). As previously noted, completion mechanisms enable multiple processors to coordinate by explicitly acknowledging when data has been e.g., transmitted, rendered, consumed, and/or otherwise processed.

In one exemplary embodiment, a single completion descriptor (CD) identifies a single transfer descriptor (TD). For example, in some variants CDs may be sent as individual TDs are e.g., filled with data. In other examples, one CD corresponds to multiple TDs. For example, in some variants one CD may identify all TDs associated with a data flow, or a subset thereof. In still other variants, multiple CDs can complete one or more TDs; for example, a TD which is shared among multiple endpoints may be signified with a CD for each of the endpoints. Still other variants of the foregoing will be readily appreciated by artisans of ordinary skill, given the contents of the present disclosure.

Each data pipe may be allocated an individual completion ring (CR) of completion descriptors (CDs). In one such variant, each CD includes one or more unique tags that correspond to allocated transfer descriptors (TDs) of a common transfer descriptor ring (TR). In some cases, the CD may additionally include additional information (e.g., remaining number of TDs to be completed, running counts, etc.).

The terms "individual" and/or "dedicated" refer to a resource that is solely accessible and/or unique to a single process. For example, each data pipe may be associated with a dedicated completion pipe. In one such implementation, the completion pipe includes a completion ring (CR). Other examples of a data structures useful for storing completion status may include without limitation: buffers, queues, caches, FIFOs, LIFOs, heaps, arrays, matrixes, hash tables, linked lists, and/or any other allocable memory resources.

As used herein, the term "completion pipe" refers to a sequence of data structures which correspond to, and convey a completion status, of data elements of a corresponding data pipe. The elements of a completion pipe may map on a one-to-one, one-to-many, many-to-one, and/or many-to-many basis to the elements of the corresponding data pipe.

As used herein, the term "completion" refers to the actual end and/or result achieved by a process of finite actions and/or steps. A completion may indicate success (all the finite actions and/or steps of the process were performed successfully and/or achieved expected ends and/or results), failure or incomplete (e.g., at least one action and/or step of the process was not performed, did not succeed, or did not achieve the expected end/result), timeout (e.g., at least one action and/or step of the process was not performed within an allotted time), indeterminate (e.g., the process outcome cannot be determined based on e.g., security and/or permissions requirements), error condition, and/or any other information regarding processor execution or status.

As previously described, in some implementations, a data flow is delivered via a subset of transfer descriptors (TDs) of a common transfer descriptor ring (TR). Thus, in one such example, a completion pipe is composed of corresponding set of completion descriptors (CDs) that correspond to the subset of TDs. A completion descriptor (CD) may include a unique tag that identifies the TD and a completion status (e.g., success, failure, timeout, indeterminate, and/or error condition).

More generally, artisans of ordinary skill in the related arts will readily appreciate that associating a dedicated completion resource for each data pipe enables efficient control over data flow transfer via a common transfer data structure (which has no data pipe affinity). Unlike prior art solutions that allocate and control individual data pipes directly, the disclosed embodiments may allocate and control individual completion pipes that correspond to data flows delivered within a common data structure. From a functional standpoint, the underlying management and control offered by such a scheme remains similar. However, rather than creating and destroying memory allocations for each data pipe in their entirety, the completion pipes of the present disclosure allow for piecemeal destruction and reclamation of the elements of the corresponding portions within the common data structure.

Additionally, it should be noted that TDs account for significantly more memory than CDs; in one exemplary embodiment, even though a TD is relatively small the backing buffer may be substantial (e.g., a 4 MB buffer), whereas a CD only requires 128 bits. Thus, tracking data flow status within individual CDs/CR may be substantially smaller than techniques using TDs/TR. Still other memory management benefits will be readily appreciated by those of ordinary skill, given the contents of the present disclosure.

The first processor may determine or otherwise infer that the individual transfers have completed without explicit notification. For example, the transfer ring may be associated with a head and tail pointer. The entries between the head and the tail pointer in succession belong to the one processor (e.g., the host), whereas the entries between the tail and the head pointer in succession belong to the other processor (e.g., the peripheral). Consequently, either processor may infer that entries that have been relinquished by the other processor can be retrieved/processed. For example, if a host processor determines that the head or tail pointer has moved, then the old data within the entries are inferred to have completed.

Multiplexing and de-multiplexing data may be included within the transfer data structures themselves (e.g., rather than in completion information). Multiplexing information may be parsed by the processors to determine which data structures should be routed to corresponding data pipes (see e.g., step 906 infra). For example, rather than including tags in completion information, the transfer data structures may include metadata within headers or footers that identify their corresponding pipe. Various other techniques for identifying pipe affinity will be readily appreciated by those of ordinary skill in the related arts, given the contents of the present disclosure.

In another such implementation, completion may be inferred from information within the data itself. For example, in one such variant, each TD is associated with a time-to-live (a lifespan for the TD data) or time-to-die (an absolute expiration time for the TD data). Once the TD has surpassed the time-to-live or time-to-die, then the TD is completed. Other common examples of such time based schemes include e.g., timeout, watchdog timers, and/or other unresponsive data handling.

In still other implementations, the first processor determines when an individual transfer cannot complete or should otherwise be terminated. For example, in some situations, a data flow is terminated with outstanding TDs; thus the outstanding TDs can be flushed pre-emptively. In another such example, a data flow with outstanding TDs has a lower priority than a more urgent data flow. For example, a background data flow may be of relatively low priority and tolerant of interruption (e.g., DNS reply packets and/or TCP SYN/SYN_ACK packets that are not associated with any particular user application, etc.), whereas a user-space data flow may need to be immediately serviced so as maximize user experience.

Various other completion and/or non-completion variants may be substituted with equivalent success by those of ordinary skill, given the contents of the present disclosure.

At step 906 of the method 900, one or more data records are de-multiplexed from a common data structure and routed to a corresponding data pipe based on the individual completion pipes.

As used herein, the term "data flow" refers to a sequence of data structures which are provided via a "data pipe." In one exemplary embodiment, a data flow carries a sequentially ordered set of data packets. For example, a data flow may be composed of a set of Internet Protocol (IP) data which must be delivered in a specified sequence. In other embodiments, a data flow may non-sequentially ordered. For example, a data flow may be composed of a set of data with no required order for delivery. While data packets generally include both a payload of data and associated networking information (e.g., source address, destination address, sequence information, error detection information, etc.), other data structures may be substituted with equivalent success. For example, a data flow may be composed of an ordered set of data payloads without any networking information.

In one such variant, the data packets are Internet Protocol (IP) packets that create an IP flow when arranged in order. IP packets contain a header that includes information such as: quality of service (QoS), length, time-to-live (TTL), protocol identification, sequence number, source IP address, destination IP address, checksum, and/or one or more optional fields. IP flows and packets are commonly used with a variety of transport technologies, including without limitation: transmission control protocol (TCP) and/or user datagram protocol (UDP). Still other packet and flow types may be readily substituted herein given the contents of the present disclosure, the exemplary IP paradigm being purely illustrative of one common data flow type.

In one exemplary embodiment, a data flow is generated or consumed by a process. As used herein, a "process" or "thread" refers to a series of instructions executed by a processor. A software application may dynamically create and/or destroy multiple processes during operation. Software applications may encompass both kernel-space and user-space applications. In one exemplary embodiment, a data pipe enables data flow communication between two complementary software applications executing from different processors; in one such variant a first of the software applications executes from a first processor and a second of the software applications executes from a second processor.

In some variants, a data pipe may be associated with multiple processes. For example, multiple processes may generate data which is consumed by one process. In other such implementations, one process generates data that is consumed by multiple processes. Still other implementations may be allow for a one-to-one, one-to-many, many-to-one, or many-to-many type connection between processors. Moreover, while the foregoing discussion of data pipes is primarily directed to unidirectional delivery of data, artisans of ordinary skill in the related arts will readily appreciate that bi-directional delivery of data may be substituted with equivalent success, given the contents of the present disclosure.

In one exemplary embodiment, a data flow is generated as a continuous stream of data for a process. In another embodiment, a data flow is stored within a memory buffer (or other memory allocation) that is specific to a process. In some embodiments, the data flow is generated by aggregating or otherwise combining multiple buffers of data associated with a process. In one such variant, the segments of the buffer are further sequentially ordered or otherwise numerically identified so that the original flow or a copy thereof can be reconstructed from the segments.

As used herein, the term "data structure" refers without limitation to any particular schema for organizing and storing data such that it can be accessed and modified. A data structure is generally characterized by one or more of: (i) the collection of data elements, (ii) the relationships between the various data elements (if any), and (iii) the functions or operations that can be applied to the data. Common examples of data structures include without limitation scalars, records, vectors, arrays, multi-dimensional arrays, linked lists, hashes, union, classes, buffers, circular or ring buffers, FIFO (first in, first out) buffers, LIFO (latest in, first out), graphs, trees, and/or any other structured data.

In some implementations, the constituent data structures of the data flows may have been multiplexed into a common data structure. For example, the data payloads of the data flows are copied into transfer descriptors (TDs) of a commonly shared transfer descriptor ring (TR). As used herein, the term "multiplex" and "multiplexing" refers to methods for combining multiple signals over a shared medium. In contrast, the terms "de-multiplex" and "de-multiplexing" refer to methods for extracting multiple signals that have been combined over a shared medium. De-multiplexing may be done in a complementary method to multiplexing, thus for example a round-robin multiplexing scheme may be de-multiplexed according to a round-robin de-multiplexing scheme. De-multiplexing according to a complementary scheme may be preferable because the peripheral processor can retrieve data in the order that it was originally queued within the common data structure. This reduces overall computational complexity for the peripheral processor and also provides straightforward and predictable delivery for the host processor.

As a brief aside, multiplexing may be scheduled "fairly" or "unfairly"; fair scheduling ensures that a feasible allocation to any participant does not result in the decrease in the allocation of some other participant with a substantially equal (e.g., within tolerance) or smaller allocation. In other words, under a "fair" scheme, data flows for all of the participants rise and fall approximately commensurately. Fair scheduling generally ensures that all data flows receive relatively stable quality, at the expense of overall connection bandwidth. In contrast, unfair scheduling allocates resources so as to e.g., optimize the overall connection bandwidth, reduce power consumption, provide prioritized burst data delivery, and/or any number of other optimizations. Unfair scheduling generally trades-off lower performance for some participants (or applications), to prioritize other participants (or applications).

While the de-multiplexing generally must preserve the intended destination, the order of retrieving data flows can be changed. More directly, so long as all of the data is routed to its appropriate destination, the prioritizing some data flows over others may be preferable to optimize processor operation. Consequently, de-multiplexing may be done based on separate considerations from multiplexing. For example, a peripheral may fill allocations according to a round-robin scheme but the host may retrieve according to a shortest-job-first prioritization so as to minimize the average amount of time each process has to wait until its execution is complete. In other examples, a host processor may fill allocations according to a highest-response-ratio that prioritizes jobs that have spent a long time waiting over short run times (to prevent such jobs from being starved by other jobs). More generally, a processor may consider internal and/or external factors when de-multiplexing the common data structure so as to prioritize servicing some data flows independently of the other processor.

In some variants, the internal factors may include without limitation: computational complexity, memory, time, and/or any other limited resource. In some embodiments, the external factors may include without limitation: network congestion, network accessibility, power consumption, business considerations, etc.

In some implementations, the de-multiplexing may be signaled on the basis of an explicit notification signaling e.g., a GPIO, interrupt, vector, doorbell signal, or other explicit signaling. In other examples, the provisioning may be implied. For example, the peripheral processor may determine that an array or array index has changed. Various other implementations may use e.g., in-band, out-of-band, timer based, and/or other signaling techniques.

De-multiplexing may be triggered by a host processor. For example, a peripheral processor may service requests responsively to the host processor without any substantial task scheduling of its own. Such implementations may be particularly useful where the host processor and the peripheral processor are locked into a closely synchronized processing task. In other examples, de-multiplexing may be independently managed by the two processors. Under such implementations, a peripheral processor may receive requests from the host processor and schedule processing in accordance with a variety of other considerations and vice versa. For example, in some situations the peripheral processor may independently manage e.g., power consumption and/or processing priority.

Once the data has been retrieved based on the individual completion pipes, the corresponding portions of the data structure can be freed or de-allocated (step 908 of the method 900). Once a completion descriptor (CD) for a transfer descriptor (TD) is received, the completed TD may be released back into the pool of TDs that are available for allocation.

Still other variations of the foregoing will be readily appreciated by those of ordinary skill in the related arts given the contents of the present disclosure.

Figure 10:
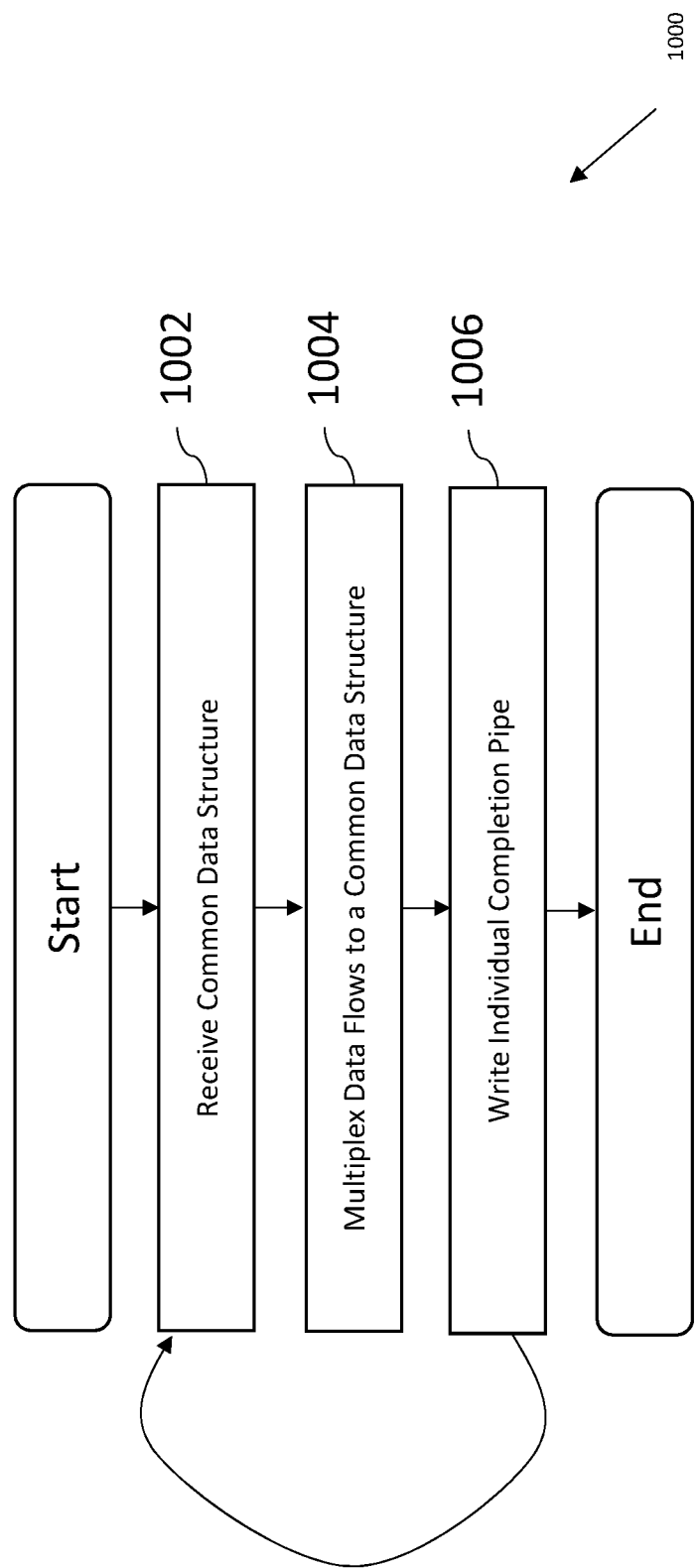
FIG. 10 is a logical flow diagram of one generalized method for multiplexing data flows between multiple processors over a common data structure, in accordance with various aspects of the present disclosure.

FIG. 10 illustrates a generalized method 1000 for multiplexing data flows into a common data structure.

At step 1002 of the method 1000, a common data structure allocation is received for processing.

As used herein, the term "process" and/or "processing" refers to a series of finite actions and/or steps taken in order to achieve a particular end and/or result. A process may be executed by a processor, dedicated hardware, and/or any other form of logic that performs logical operations. Examples of processing alternatives include, without limitation, reduced instruction set computer (RISC) processors, complex instruction set computing (CISC) processors, field-programmable gate arrays (FPGAs), application specific integrated circuits (ASICs), and programmable logic devices (PLDs).

In some implementations, processing the common data structure allocation may include receiving data to fill a data pipe. For example, the modem of a user device may wirelessly receive the data from another device external to the user device, such as an access point. Depending on the number of data structures and/or amount of data that is read from the data structures (which may continue to be populated with additional data structures by the host), some implementations may also enable processing and/or transfer of larger data, such as images, animations, videos, and documents.

Processing the common data structure allocation may include transmitting data received via a data pipe. For example, the modem of a user device may wirelessly transmit the data to another device external to the user device, such as an access point. Various wireless device-specific implementations may include without limitation: a media application (e.g., earbud, headset, speaker peripherals), data input (e.g., computer mouse, keyboard), computing and home appliances (e.g., printer, thermometer, TV), and monitoring and synchronization of data between one or more of the foregoing.

Processing the common data structure allocation may include processing data received via a data pipe within a media application for e.g., playback, capture, and/or rendering. Common examples of media applications include audio codec operation, video codec operation, human interface operation (e.g., touchscreen, keyboard, mouse, headset, and/or any other human interface peripheral). Persons having ordinary skill in the relevant art will recognize that various media interfaces may be enabled depending on the hardware (e.g., displays, speakers, microphones, and human interface elements, both indigenous to the device and/or externally coupled to the device).

The processor may generate or receive one or more data structures for delivery via the common data structure allocation. That is the processor has payload data to fill the data structures of the common data structure. For example, the payload data may include audio data that is played via a speaker or wired headphones. Alternatively, the payload data may include an image that has been rendered or processed by the first and/or second processor. The payload data may include instructions to display or modify a user interface. The payload data may also include video data to be displayed on the user device.

The peripheral processor may process the common data structure allocation independently of the host processor. More directly, the peripheral processor may consume the common data structure allocation without requiring the host processor to provide e.g., task scheduling, clock, power, processing code, or other logic. In other words, the peripheral processor's processing of the one or more data structures is isolated from the host processor. This enables the host/peripheral processor to e.g., switch to other tasks and/or transition into various power-conserving modes irrespective of the other processor's tasks.

The peripheral processor may process the common data structure allocation in conjunction with/or concurrently with other related tasks of the host processor. For example, the peripheral processor processes the common data structure allocation according to scheduling requirements set forth by the host processor. A baseband processor may be required to receive data from a wireless network at a specified time interval in order to ensure that certain application requirements (running at an application processor) are met. Still other implementations may require that the host and peripheral processor share one or more of e.g., clock, power, processing code, or other logic. In some cases, the host and peripheral processor dynamically adjust the amount of data that is processed according to e.g., load balancing, power consumption, performance requirements, and/or any number of other system wide considerations.

Artisans of ordinary skill in the related arts will readily appreciate that a data structure may not directly map one-to-one to a process. One or more data structures may be used by one or more processes. Moreover, each process may include sub-processes and/or be subsumed within a larger process or activity. For example, a continuous streaming media file may be composed of a single set of TDs that include both audio and video. Alternatively, a continuous streaming media file could be composed of two sets of TDs one for audio, and one for video. Another common example might include web browsing, where the contents of a web page may be conveyed in a common pipe, or alternatively split up into different data pipes for different media, etc.

More generally, artisans of ordinary skill in the related arts will readily appreciate the broad spectrum of different methods for data structure processing, the foregoing being purely illustrative of the broader methods described herein. Other common examples of data processing include without limitation: network communication, media processing, machine learning/artificial intelligence, big data analysis, encryption/decryption, authentication, validation, searching, sorting, reporting, and/or any other collection and manipulation of data to produce meaningful information.

At step 1004 of the method 1000, one or more data flows are multiplexed into the common data structure. For example, the common data structure may be a transfer ring (TR) that includes a common pool of transfer descriptors (TDs) that can be freely distributed among one or more data flows.

Data packets of the data flows may be multiplexed over the transfer descriptors (TDs) of the common transfer ring (TR) according to fair scheduling. For example, each data flow receives its commensurate share of TDs. One such scheme is a "round robin" allocation, wherein each data flow is allocated an equal amount of TDs in circular order. If a data flow has a queue larger than this round of allocation, then the excess must wait for the next round. Similarly, if a data flow has a queue that is smaller than this round of allocation, then the excess allocation may be inefficiently utilized.

The data packets of the data flows may be multiplexed unfairly to e.g., prioritize a particular data flows and/or to optimize overall TR operation. One such scheme is a "first-come-first-served" allocation, wherein each data flow is allocated TDs according to their order and magnitude of request. Under a first-come-first-served scheme, the first process to request receives its total required allocation; the second receives its allocation from what remains, etc. Notably, the last requestor may be left out, resulting in under-serviced processes.

Still other examples may use a hybridized allocation scheme providing some degree of fairness and/or unfairness so as to provide sufficient service quality while still offering some degree of overall performance improvement. Common examples of such schemes include e.g., best-effort, prioritized, weighted round robin, shortest-job-first, shortest-remaining-time, high-response-ratio, and/or any other scheme for allocating the multiple data flows among a pool of resources.

At step 1006 of the method 1000, an individual completion pipe corresponding to the processed data flow is written. For example, the individual completion pipe is written with a completion status and a unique tag identifying the corresponding transfer descriptors (TDs) associated with the completion pipe.

The individual completion pipe may be provided to another processor. The provisioning of the individual completion pipe may include writing in whole, or in part, the completion pipe to a shared memory. The provisioning of the individual completion pipe may include writing in whole, or in part, the completion pipe to a buffer memory. The provisioning of the individual completion pipe may include writing in whole, or in part, the completion pipe to the second processor's memory.

The provisioning of the individual completion pipe may include a physical bus access (e.g., writing over a data bus). In some such variants, the provisioning of the individual completion pipe may be performed over a memory bus. In other such variants, the provisioning may be performed over a serial bus. In still other variants, the provisioning may be performed over a parallel bus.

The provisioning may include an explicit notification signaling. Common such examples include interrupts, GPIOs, and/or register or memory writes. In other examples, the provisioning may be implied. In one such implementation, the provisioning may include a write to a completion array (e.g., a head index array and/or a tail index array that identify one or more completion data structures).

Various other techniques for provisioning of an individual completion structure will be readily appreciated by those of ordinary skill in the related arts given the contents of the present disclosure.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for de-multiplexing data flows via a commonly shared data structure, the method comprising:
   providing the commonly shared data structure to at least a first processor apparatus and a second processor apparatus, the commonly shared data structure being configured to be commonly shared by at least the first and second processor apparatus, and further configured to record a plurality of data received via multiple data pipes, the plurality of data each being configured to reference a respective location of a pre-allocated memory that is associated with the commonly shared data structure, the multiple data pipes each corresponding to (i) the commonly shared data structure and (ii) a respective individual completion data structure;
   responsive to a transfer event, reading an individual completion data structure corresponding to an individual data pipe of the multiple data pipes to identify a completion status of the commonly shared data structure;
   causing a de-multiplexing of a data flow for the individual data pipe from the commonly shared data structure based on the completion status; and
   releasing for reallocation a corresponding one of the plurality of data recorded in the commonly shared data structure.

2. The method of claim 1, wherein the providing of the common data structure comprises allocating a first memory space for the common data structure, the first memory space being of a fixed size.

3. The method of claim 2, wherein the allocating of the first memory space comprises determining the fixed size based on one or more physical bus considerations.

4. The method of claim 1, wherein the de-multiplexing of the data flow for the data pipe comprises reading one or more tags associated with the completed portion; and
   wherein the one or more tags identify the data pipe from a plurality of data pipes.

5. The method of claim 4, wherein the de-multiplexing of the data flow for the data pipe further comprises sequentially ordering one or more data payloads within the completed portion.

6. The method of claim 4, wherein the de-multiplexing of the data flow for the data pipe is fair.

7. The method of claim 4, the de-multiplexing of the data flow for the data pipe is unfair according to one or more priority schemes.

8. The method of claim 1, wherein the providing of the common data structure comprises describing a transfer ring with an index array; and
   wherein the freeing of the completed portion of the common data structure comprises updating the index array.

9. The method of claim 1, wherein the providing of the common data structure comprises describing a transfer ring with an index array; and
   wherein the transfer event comprises a change to the index array.

10. A method for multiplexing a plurality of data flows corresponding to a plurality of data pipes into a commonly shared data structure, comprising:
    receiving the commonly shared data structure, the commonly shared data structure being commonly accessible by a first processor apparatus and a second processor apparatus;
    multiplexing the plurality of data flows corresponding to the plurality of data pipes into the commonly shared data structure, the multiplexing comprising causing the commonly shared data structure to assign respective ones of the plurality of data pipes to sets of data structures, the sets of data structures referencing data to be transferred between the first and second processor apparatus, the data to be transferred being stored in a buffer structure associated with the commonly shared data structure;
    writing identifying information correlating to respective ones of the sets of data structures to each of a plurality of individual completion pipes, wherein each individual completion pipe corresponds to a respective one of the plurality of data pipes; and
    wherein each identifying information of the plurality of identifying information identifies a corresponding portion of the commonly shared data structure.

11. The method of claim 10, wherein the multiplexing of the plurality of data flows comprises, for each data flow:
    dividing the data flow into a set of data records; and
    the set of data records is associated with a corresponding data pipe of the data flow.

12. The method of claim 11, wherein the multiplexing of the plurality of data flows further comprises:
    selecting data records associated with one or more data flows for multiplexing; and
    for each selected record:
       writing the selected record to a portion of the commonly shared data structure.

13. The method of claim 12, wherein the selecting of data records comprises fairly allocating bandwidth to the plurality of data flows.

14. The method of claim 12, wherein the selecting of data records comprises unfairly allocating bandwidth to prioritize one or more data flows.

15. An apparatus configured to transact multiple data flows between multiple processors, comprising:
    a first processor in data communication with a second processor via a commonly shared transfer ring, the commonly shared transfer ring being shared by the first processor and the second processor; and logic configured to allocate the commonly shared transfer ring within a non-transitory computer-readable medium;

wherein the non-transitory computer-readable medium comprises instructions configured to, when executed by the first processor, cause the first processor to:

receive one or more completion descriptors within each individual completion ring of a plurality of completion rings, the each individual completion ring corresponding to one of the multiple data flows;

identify one or more transfer descriptors of the commonly shared transfer ring based on the received one or more completion descriptors, the commonly shared transfer ring corresponding to all of the multiple data flows;

retrieve, from a storage apparatus associated with the commonly shared transfer ring, data payloads associated with the identified one or more transfer descriptors, the one or more transfer descriptors identifying respective one or more memory locations of the data payloads;

reconstruct the plurality of data flows based on the retrieved data payloads; and free the identified one or more transfer descriptors within the commonly shared transfer ring.

16. The apparatus of claim 15, wherein:
the commonly shared transfer ring is characterized by a tail index; and
the instructions are further configured to, when executed by the first processor, cause the first processor to free the identified one or more transfer descriptors further comprises instructions to write to the tail index.

17. The apparatus of claim 15, wherein:
the individual completion ring is characterized by a head index; and
the instructions are further configured to, when executed by the first processor, cause the first processor to receive one or more completion descriptors further comprises instructions to read the head index.

18. The apparatus of claim 15, wherein the commonly shared transfer ring is configured to multiplex the one or more transfer descriptors associated with the retrieved data payloads for the reconstructed plurality of data flows associated with a plurality of data pipes; and
wherein the individual completion ring is associated with only one data pipe.

19. The apparatus of claim 18, further comprising logic configured to reconstruct the only one data pipe from the retrieved data payloads based on the received one or more completion descriptors.

20. The apparatus of claim 15, wherein retrieval of the data payloads further comprises retrieval of the data payloads in an order to prioritize a data flow independently of the second processor.

* * * * *